US011625731B2

(12) United States Patent
Negi et al.

(10) Patent No.: US 11,625,731 B2
(45) Date of Patent: Apr. 11, 2023

(54) METHODS, SYSTEMS AND APPARATUS TO TRACK A PROVENANCE OF GOODS

(71) Applicant: Intel Corporation, Santa Clara, CA (US)

(72) Inventors: Ansuya Negi, Beaverton, OR (US); Rita H. Wouhaybi, Portland, OR (US); Igor Tatourian, Santa Clara, CA (US); Oleg Pogorelik, Lapid (IL); Ned M. Smith, Beaverton, OR (US); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 16/609,405

(22) PCT Filed: Jun. 30, 2017

(86) PCT No.: PCT/US2017/040281
§ 371 (c)(1),
(2) Date: Oct. 29, 2019

(87) PCT Pub. No.: WO2019/005104
PCT Pub. Date: Jan. 3, 2019

(65) Prior Publication Data
US 2020/0184489 A1 Jun. 11, 2020

(51) Int. Cl.
*G06Q 30/00* (2012.01)
*G06Q 10/08* (2012.01)
(Continued)

(52) U.S. Cl.
CPC ....... *G06Q 30/0185* (2013.01); *G06F 16/258* (2019.01); *G06Q 10/0832* (2013.01);
(Continued)

(58) Field of Classification Search
CPC ............. G06Q 30/0185; G06Q 30/018; G06Q 2220/10; G06F 16/258; H04L 9/3239; H04L 9/3247; H04L 9/50; H04L 2209/88
(Continued)

(56) References Cited

U.S. PATENT DOCUMENTS 10,053,697 B1* 8/2018 Smolke .............. G01N 33/5308
2011/0016318 A1 1/2011 Syngkon et al.
(Continued)

FOREIGN PATENT DOCUMENTS

GB 2376686 * 11/2002
KR 10-2016-0063006 6/2016

OTHER PUBLICATIONS

"Next Generation DNA Sequencing and the Future of Genomic Medicine", dated May 25, 2010 Downloaded from https://www.ncbi.nlm.nih.gov/pmc/articles/PMC3960862/pdf/genes-01-00038.pdf and attached as PDF file. (Year: 2010).*

(Continued)

*Primary Examiner* — James D Nigh
(74) *Attorney, Agent, or Firm* — Hanley, Flight & Zimmerman, LLC

(57) ABSTRACT

Methods, apparatus, systems and articles of manufacture are disclosed to track a provenance of goods. An example apparatus includes an unsigned block generator to generate a first unsigned block to store first processing data associated with the product by a first entity, a block signature engine to sign the first unsigned block with a first private key to generate a blockchain having a first signed block, the unsigned block generator to generate a second unsigned block in response to a second entity generating second processing data associated with the product by the second entity, the block signature engine to expand the blockchain by signing the second unsigned block with a second private (Continued)

key to generate a second signed block within the blockchain, and a blockchain validator to verify the product provenance by validating the first processing data and the second processing data using respective public keys associated with the first entity and the second entity.

24 Claims, 13 Drawing Sheets

(51) Int. Cl.
  *H04L 9/32* (2006.01)
  *H04L 9/00* (2022.01)
  *G06F 16/25* (2019.01)
  *G06Q 30/018* (2023.01)
  *G06Q 10/0832* (2023.01)

(52) U.S. Cl.
  CPC .......... *H04L 9/3239* (2013.01); *H04L 9/3247* (2013.01); *G06Q 2220/10* (2013.01); *H04L 9/50* (2022.05)

(58) Field of Classification Search
  USPC .......................................... 705/51
  See application file for complete search history.

(56) References Cited

U.S. PATENT DOCUMENTS

| | | |
|---|---|---|
| 2014/0046698 A1 | 2/2014 | Skocic |
| 2014/0129288 A1 | 5/2014 | Eager et al. |
| 2016/0164884 A1* | 6/2016 | Sriram ............... G06Q 10/0833 705/51 |
| 2017/0199962 A1* | 7/2017 | Ganeshalingam ..... G16B 30/10 |
| 2017/0337552 A1* | 11/2017 | Mandal ................ G06Q 20/326 |
| 2018/0254898 A1* | 9/2018 | Sprague .................. H04L 9/006 |
| 2018/0349845 A1* | 12/2018 | Klein ................. G06Q 10/0833 |
| 2020/0162243 A1* | 5/2020 | Fletcher .................... H04L 9/30 |
| 2021/0035657 A1* | 2/2021 | Ceze ....................... G16B 30/10 |
| 2022/0321359 A1* | 10/2022 | Nosseir ................. H04L 9/0861 |

OTHER PUBLICATIONS

"DNA-Genetic Encryption Technique", Jul. 2016, attached as PDF file, downloaded from https://www.mecs-press.org/ijcnis/ijcnis-v8-n7/IJCNIS-V8-N7-1 .pdf (Year: 2016).*

Shrier et al. "Massachusetts Institute of Technology Blockchain & Infrastructure (Identity, Data Security)" Part 3, May 2016, 18 pages (Year: 2016).*

International Searching Authority, "International Search Report," mailed in connection with International Patent Application No. PCT/US2017/040281, dated Feb. 22, 2018, 3 pages.

International Searching Authority, "Written Opinion," mailed in connection with International Patent Application No. PCT/US2017/040281, dated Feb. 22, 2018, 11 pages.

International Bureau, "International Preliminary Report on Patentability," mailed in connection with International Patent Application No. PCT/US2017/040281, dated Dec. 31, 2019, 12 pages.

* cited by examiner

602 ─┐

604 ─┐
606 ─┐ Entity Type: Source/Farmer (Originating Entity)
608 ─┐ Entity ID: CF_2017
      Authorized Public Key: _____
610 ─┐
612 ─┐ Authorized Sensor #1: Soil Sensor
614 ─┐ Sensor #1 Public Key: _____
      Sensor #1 TEE Compliant?: YES Authorized Sensor #2: Irrigation Sensor
Sensor #2 Public Key: _____
Sensor #2 TEE Compliant?: YES 616 ─┐
      DNA Marker Public Key: _____
618 ─┐
620 ─┐ Entity Name: _____
622 ─┐ Entity Address: _____
624 ─┐ Organic Certification #: _____
      Phone #: _____
      ...
      ...
      ...

FIG. 6

METHODS, SYSTEMS AND APPARATUS TO TRACK A PROVENANCE OF GOODS

CROSS-REFERENCE TO RELATED APPLICATIONS

This patent arises from a 371 Nationalization of International Patent Application Serial No. PCT/US2017/040281, which is entitled "METHODS, SYSTEMS AND APPARATUS TO TRACK A PROVENANCE OF GOODS," and which was filed on Jun. 30, 2017, the subject matter of which is expressly incorporated herein by reference in its entirety.

FIELD OF THE DISCLOSURE

This disclosure relates generally to product verification, and, more particularly, to methods, systems and apparatus to track a provenance of goods.

BACKGROUND

In recent years, consumers of goods have exhibited an increased expectation for verification of the quality and/or handling of purchased products. In some examples, consumers expect to pay a particular premium price for goods that have particular characteristics, such as organically certified produce. Suppliers and/or retailers of consumer products may advertise such characteristics, but in many examples the consumers do not have any particular indication that the retailer claims are true.

BRIEF DESCRIPTION OF THE DRAWINGS

FIG. 6 is an example entity data entry generated by the example blockchain network environment of FIG. 3.

Figure 1:
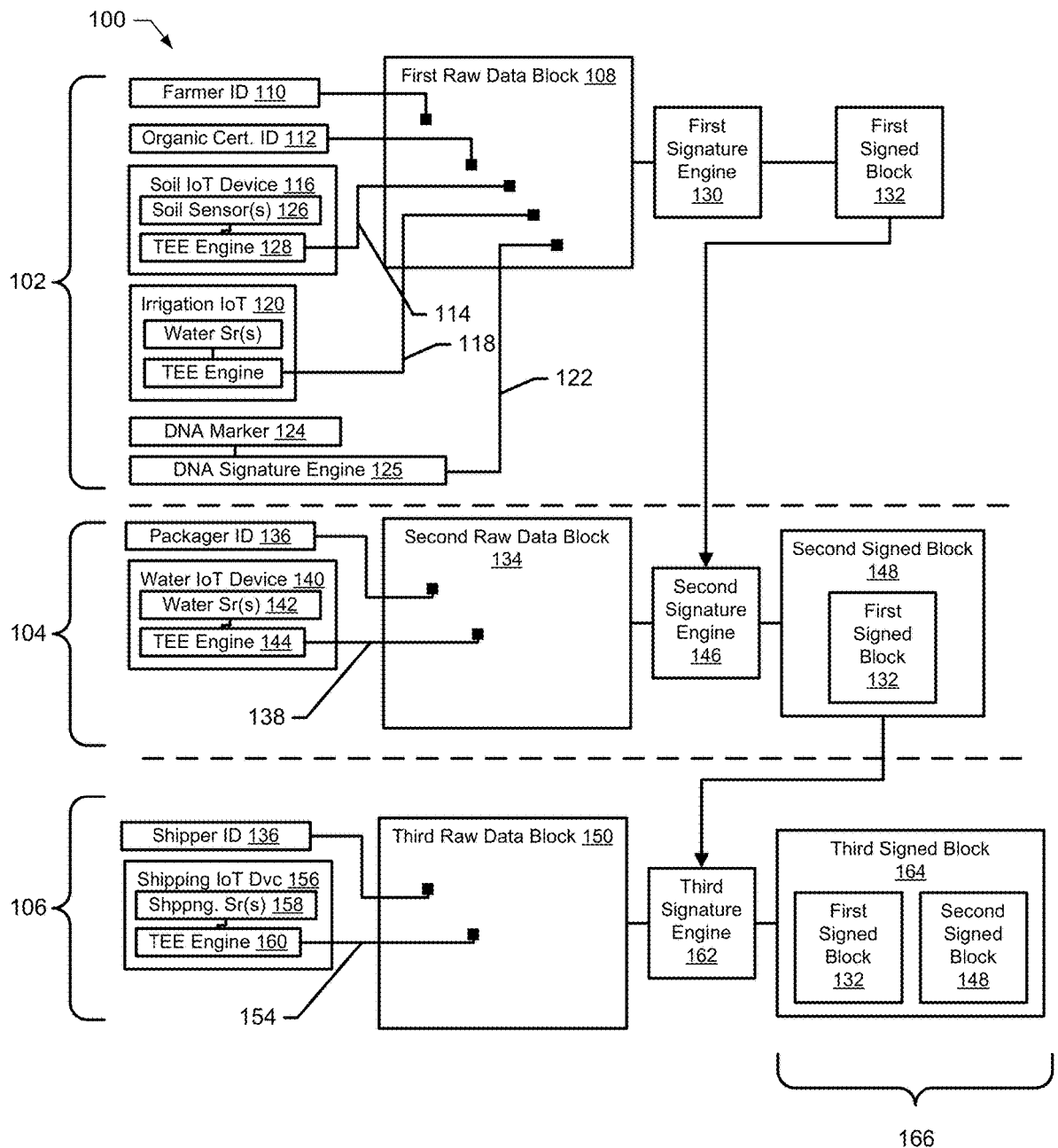
FIG. 1 is a schematic illustration of an example blockchain creation environment constructed in accordance with the teachings of this disclosure to track a provenance of goods.

The figures are not to scale.

DETAILED DESCRIPTION

Despite a consumer's purchase of a product that is labelled as "Certified Organic," there are no assurances for the consumer regarding the validity of labelled claims. Even if some consumers are not interested in particular product characteristics such as organic certification, those consumers have no information of the product they purchase regarding its origin, growing conditions, packaging conditions, shipping conditions and/or amount of time on a store/retailer shelf. In other words, consumers frequently purchase products based entirely on a degree of trust with labelling and/or retailer perceived quality and/or trust.

In some examples, a consumer purchases a product that lasts several days at the consumer household prior to exhibiting indications of decomposition. During other purchasing instances, that consumer may purchase the same product, but it exhibits indications of decomposition much sooner than it had in the past. In some examples, the accelerated rate of observed decomposition may be due to a correspondingly longer time on the retailer shelf before being purchased by the consumer. In some examples, the accelerated rate of observed decomposition may be due to different packaging conditions (e.g., a higher mineral content in rinse-water), different shipping conditions (e.g., a warmer temperature in a shipping truck), or different soil and/or irrigation conditions during the growing process. Examples disclosed herein facilitate tracking a provenance of such goods so that additional information related to the purchased product can be ascertained and/or otherwise verified.

In some examples, a consumer makes a product purchase because that product is grown and/or otherwise cultivated by a particular source, such as a preferred farmer, a preferred breeder, etc. Aside from product packaging consumers have no mechanism by which they can verify that the purchased product is actually from the preferred farmer/breeder. Examples disclosed herein facilitate a mechanism by which the goods purchased by a consumer can be verified as sourced from the farmer/breeder of interest.

Examples disclosed herein enable product provenance tracking in a manner that provides product handling information on a stage by stage basis. As used herein, "provenance" reflects historical and/or otherwise chronological data associated with product handling activity. As used herein, a "provenance stage" is one of any number of entities that handles and/or otherwise processes the product of interest. Example provenance stages include, but are not limited to produce growers (e.g., farmers), produce packagers (e.g., produce soil removal services, produce cleaning services, produce packaging services, etc.), produce shippers (e.g., refrigeration vehicles to transport produce from a farm to a grocery store, freight companies, distributors, etc.), and/or produce retail outlets (e.g., grocery stores, warehouse outlets, convenience stores, etc.). Examples disclosed herein segregate and/or otherwise organize different provenance stages into blocks, in which two or more blocks may form a blockchain. The product handling activity is stored within each block of a blockchain such that a recipient of a completed blockchain (e.g., a blockchain that has blocks to describe every provenance stage of a product of interest) can identify and/or otherwise reveal details associated with each provenance stage that a product has experienced.

FIG. 1 illustrates an example blockchain creation environment 100. In the illustrated example of FIG. 1, the blockchain environment 100 includes a first provenance stage 102, a second provenance stage 104 and a third provenance stage 106. The example first provenance stage 102 includes activities related to a farmer that sources (e.g., grows) a product of interest (e.g., onions), the example second provenance stage 104 includes activities related to a packaging company that cleans the product of interest (e.g., onions) and packages/labels them prior to shipment, and the example third provenance stage 106 includes activities related to a shipping company that transports the onions in refrigerated containers to one or more sale destinations (e.g., grocery stores).

Each provenance stage includes a raw data block to store information (e.g., cleartext information/data) related to one or more aspects of the provenance stage, and then signs the raw data block using a private key unique to the entity responsible for that data. In the illustrated example of FIG. 1, the first provenance stage 102 includes a first raw data block 108 to store information associated with activities of the farmer entity. The example first raw data block 108 includes data associated with a farmer identifier 110, an organic certification identifier 112, signed soil data 114 data from a soil Internet of Things (IoT) device 116, signed irrigation data 118 from an irrigation IoT device 120, and signed deoxyribonucleic acid (DNA) information 122 from DNA marker information 124 that may have been extracted from the product of interest and signed by an example DNA signature engine 125.

In some examples, the soil IoT device 116 includes one or more soil sensors 126 that may take periodic, aperiodic, scheduled and/or manual data samples of one or more soil locations. Example soil sensors measure soil moisture content, soil mineral content, fertilizer content and/or pesticide content. In some examples, the soil IoT device 116 aggregates a number of data samples to a memory (not shown) and then invokes one or more cryptographic devices/engines, such as an example trusted execution environment (TEE) engine 128, to sign the samples. In some examples, the soil IoT device 116 cryptographically signs acquired sensor data (e.g., with an IoT private key, a TEE private key, a private key associated with the cryptographic engine 128, etc.) before it is aggregated and/or otherwise stored to the memory. While the illustrated example of FIG. 1 includes the TEE engine for cryptographic operations and/or services, examples disclosed herein are not limited thereto. Generally speaking, a cryptographic engine takes as input a message (data) and a private key to generate a signature that is unique to the input message. The private key is not distributed in a public manner, but includes a corresponding public key that is disseminated to outside parties/entities in a public manner. In some examples, the private key is stored within hardware of the example cryptographic engine, such as the example TEE engine 128 of FIG. 1, in which the private key is inaccessible to any party (including the owner/operator of the TEE engine 128). Such protective measures reduce and/or eliminate the possibility of the private key being inadvertently and/or maliciously released.

To provide a degree of certainty and/or verification that transmission of the message (data) is authentic (e.g., properly associated with the sender of that message), the receiving party provides three (3) separate inputs to its own cryptographic engine. In particular, a first input includes the message (data) (e.g., cleartext), a second input includes the signature previously generated with the sender private key, and a third input includes the public key that is associated with the sender private key. Based on these three (3) inputs, the receiving party cryptographic engine generates an output indicative of (a) valid or (b) invalid. A valid output indicates that the message has not changed since it was signed with the private key because the signature is unique to both the message and the signing party. In some examples, cryptographic processes include a digital certificate as an electronic document containing the digital signature of a Certificate Authority (CA) bound with the public key owner's identity (and the corresponding public key). In some examples, the message is first hashed with a hashing algorithm (e.g., SHA1, SHS2, etc.), and the hash is signed with the private key (producing an encrypted hash, sometimes referred to as a "signature"). The receiving party receives the cleartext message (data), the encrypted hash, and applies the public key with its cryptographic engine to validate the message (data) is (a) unchanged and (b) sourced from the expected sender.

Returning to the illustrated example of FIG. 1, the first raw data block 108 stores the farmer ID 110, the organic certification ID 112, the signed soil data 114, the signed irrigation data 118, and the signed DNA information 122. An example first signature engine (cryptographic engine) 130 signs the example first raw data block 108 to generate an example first signed block 132. In some examples, the first signature engine 130 signs the first raw data block 108 using a private key unique to the example first provenance stage 102, in which the private key has a corresponding public key. The example first signed block 132 forms the first block of an example blockchain.

In the illustrated example of FIG. 1, the second provenance stage 104 (e.g., the packaging company) generates a second raw data block 134 to store information associated with activities of the packaging company. In particular, the example second raw data block 134 stores a packager ID 136 and signed rinse water data 138 from an example rinse water IoT device 140. The example rinse water IoT device 140 includes one or more water sensors 142 (e.g., sensors to measure water purity, parts-per-million mineral content, rinse water temperature, quantity of rinse water used per item, etc.) and a TEE engine 144 to generate the example signed rinse water data 138. An example second signature engine 146 signs the second raw data block 134 using a private key unique to the example second provenance stage 104, in which the private key has a corresponding public key. In some examples, the second signature engine 146 signs the second raw data block 134 along with (combination) the example first signed block 132 to generate an example second signed block 148, which forms the second block of the example blockchain.

In the illustrated example of FIG. 1, the third provenance stage 106 (e.g., the shipping company) generates a third raw data block 150 to store information associated with activities of the shipping company. In particular, the example third raw data block 150 stores a shipper ID 152 and signed shipping data 154 from an example shipping IoT device 156. The example shipping IoT device 156 includes one or more shipping sensors 158 (e.g., refrigeration temperature sensors, shipping duration sensors, accelerometers to measure vibration, etc.) and a TEE engine 160 to generate the example signed shipping data 154. An example third signature engine 162 signs the third raw data block 150 using a private key unique to the example third provenance stage 106, in which the private key has a corresponding public key. In some examples, the third signature engine 162 signs the third raw data block 150 along with the example second signed block 148 to generate an example third signed block 164, which forms the third block of the example blockchain. As such, an example blockchain 166 now includes the example first signed block 132, the example second signed block 148 and the example third signed block 164. In some examples, the example blockchain 166 is "unwrapped" using one or more public keys that correspond to respective private keys used during cryptographic signing of blocks and/or data therein. For example, unwrapping may begin with access to a public key associated with the example third provenance stage 106 to reveal the example first signed block 132 and second signed block 148 therein. Additionally, respective public keys associated with the example shipping IoT device 156 may then be used to verify the data acquired. Further unwrapping may occur by using a respective public key of the example second provenance stage 104 to reveal the contents of the example second signed block 148, and so on.

While the illustrated example of FIG. 1 includes IoT devices, examples disclosed herein are not limited thereto. Examples disclosed herein may employ any type and/or quantity of wired or wireless sensing devices having output data that is signed by a cryptographic technique. Examples disclosed herein reduce and/or otherwise eliminate sensing device tampering throughout the one or more provenance stages. For instance, in the event the shipper in the example third provenance stage 106 experiences an equipment malfunction that causes refrigeration temperatures to drop below a threshold value needed to maintain a degree of quality for the product being shipped, this temperature data is signed before it is stored to a memory external to the sensing device(s) (e.g., the example shipping IoT device 156). Any attempts by personnel of the example third provenance stage 106 to alter the sensor data will result in a variation of the signature generated by that device, thereby causing a failure during cryptographic validation. In some examples, participating entities of a blockchain are authorized and added to a ledger to identify their respective identities and participating order within the blockchain, as described in further detail below in connection with FIG. 5. In some examples, entities are allowed to participate in the blockchain only after registering their information within the example ledger of FIG. 5, which may include the entity's utilization of approved sensors and/or sensing devices, such as the example soil IoT device 116 that is compliant with TEE standards.

Returning to the example DNA marker information 124 in the illustrated example of FIG. 1, examples disclosed herein enable verification that the product being sold or distributed is authentic and/or accurately matches labeling of that product. For example, the farmer in the example first provenance stage 102 encodes DNA molecules of the product (e.g., in a seed stage) to uniquely identify the product. As the product is cultivated/grown, the encoded DNA information propagates to each product that is eventually cleaned, packaged, shipped and sold to consumers. Accordingly, consumers and/or food safety agencies extract a sample of the product using industry-available DNA decoding chipsets, such as NanoPore® array chips.

Figure 2:
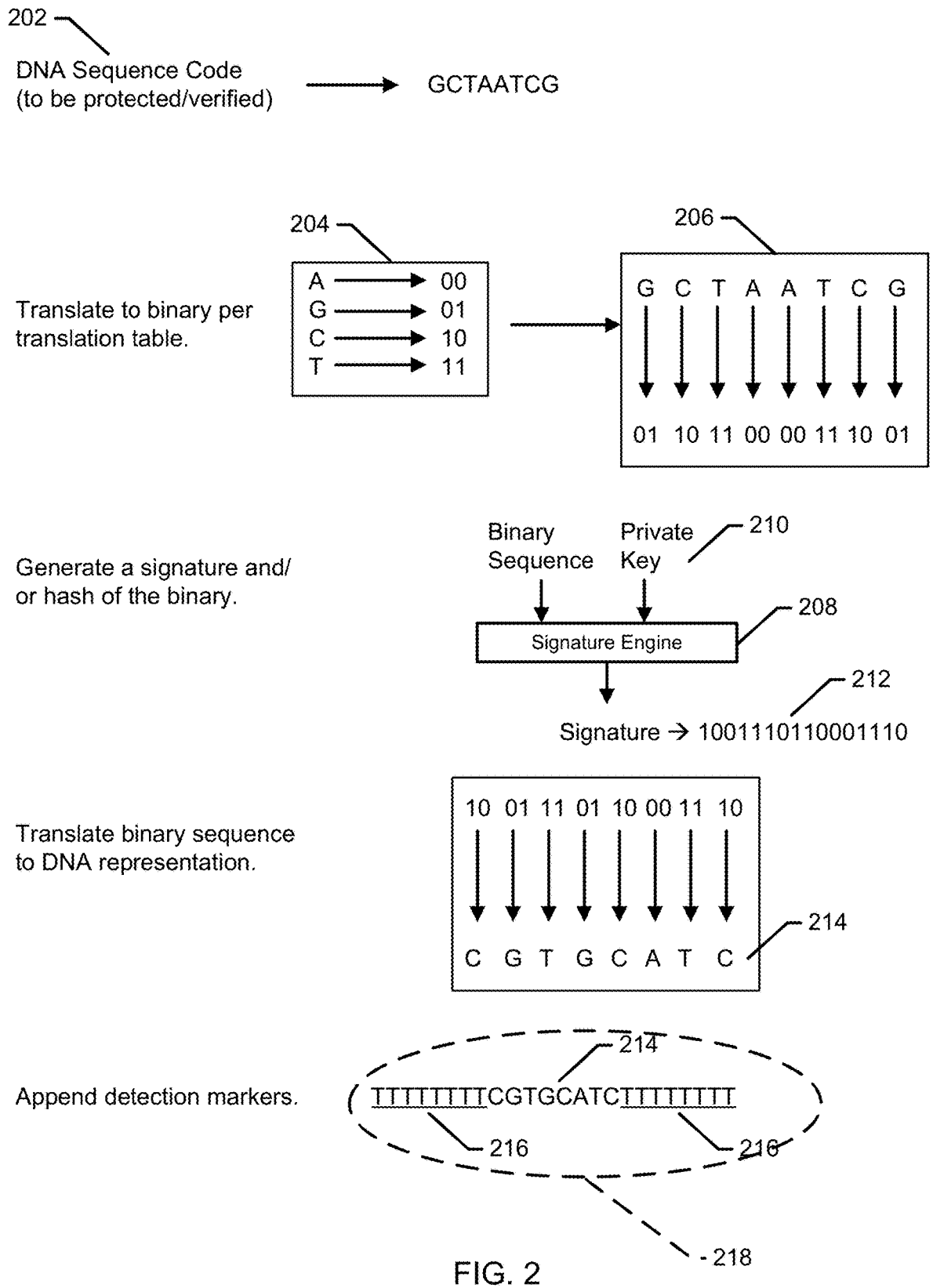
FIG. 2 is an example DNA/binary transformation process to translate DNA bases to binary representations, and to translate binary representations to DNA bases.

In operation, a DNA sequence code of interest for the product is selected and/or otherwise identified, as shown as a DNA/binary transformation process in FIG. 2. In the illustrated example of FIG. 2, a DNA sequence code 202 from the product of interest is selected. In some examples, the DNA sequence code 202 is indicative of species uniqueness, while in some examples the DNA sequence code includes other data. The example DNA sequence code contains genome level building blocks (bases) of Adenine (A), Guanine (G). Cytosine (C) and Thymine (T). These bases are mapped to four (4) base numbers of two (2) bits, as shown by an example translation table 204 of FIG. 2. Using the example translation table 204, the example DNA sequence code 202 is translated to a DNA sequence binary representation 206. The example DNA sequence binary representation 206 is applied to a cryptographic engine 208 with a private key 210 to generate a DNA sequence binary signature 212. Using the example translation table 204, the example DNA sequence binary signature 212 is translated back to a signed base representation 214. One or more marker sequences 216 may be applied to the beginning and end of the example signed base representation 214 to generate an example DNA signature 218. This example DNA signature 218 is spliced into the product (e.g., during a seed stage) such that it persists in cultivated products (fruits, vegetables, animals) during growing and/or reproduction. As such, later extraction of samples of the product can be analyzed to search for the example marker sequences 216 that surround the signed base representation 214, which may be converted back to a binary format with the example translation table 204 and applied to a cryptographic engine with a corresponding public key to confirm authenticity. In some examples, efforts to misrepresent a product being sold are thwarted when cryptographic validation of the product fails.

While the illustrated example of FIG. 2 includes a single DNA sequence code 202 to be spliced into the product, examples disclosed herein are not limited thereto. Any number of DNA sequence codes may be spliced into the product. In some examples, one or more DNA sequence codes are spliced into portions of the product DNA referred to as "junk DNA," which is defined herein as portions of non-coding DNA that exhibits no biological function for an organism (e.g., the product). Generally speaking, the portion of junk DNA for an organism varies from species to species, in which the human genome includes approximately 98% junk DNA, and a typical bacteria genome includes approximately 2% junk DNA.

While example DNA sequence codes, such as one or more example DNA sequence codes 202, may include codes (e.g., C, A and T) indicative of a unique aspect of the product genome, examples disclosed herein facilitate customizable DNA sequence codes indicative of non-DNA-based information. For example, DNA sequence codes may include information associated with a brand, a supplier (e.g., a farmer), an organic certification identifier and/or any other type of data. In some examples, non-DNA-based information is selected/generated and converted to a binary representation in a manner consistent with the example translation table 204. In some examples, one or more DNA signatures 218 containing DNA-based and/or non-DNA-based information are encoded into one or more alternate junk DNA portions of the product genome for later discovery and extraction.

In some examples, the one or more alternate portions of information insertion into the product genome facilitate stenographic techniques. For instance, examples disclosed herein enable one or more messages (e.g., one or more DNA sequence codes 202 converted into corresponding one or more DNA signatures 218) distributed throughout one or more portions of the product genome in a pattern defined by the applied stenographic technique. Stated differently, the example one or more embedded and/or otherwise spliced DNA signatures 218 form a hiding pattern of information to be decoded. In some examples, an out-of-band communication of the product genome may be used for decoding to search-for and locate the one or more hidden messages formed by the one or more spliced DNA signatures 218. In some examples, the hiding pattern (e.g., a 23-character message) may be encoded in a first junk DNA portion, a second junk DNA portion, a third junk DNA portion, etc. In some examples, one or more alternate patterns may be encoded in an effort to avoid "guessable" patterns.

Product genomes and DNA sequence codes embedded therein generally include at least two components beyond biological coding functionality. In particular, DNA sequence codes may include an informational component (e.g., brand information, farmer identification information, organic certification information, etc.) and/or an authentication component. Cryptographic hashes and/or signatures may be used to determine authenticity, and the information being authenticated may include such additional informational components. In still other examples, an encryption key is used to hide and/or otherwise obfuscate one or more DNA sequence codes. In some examples, a particular key length applies an additional burden on an amount of base-coding needed to modify/insert/splice a message into the product genome. Such information hiding enables additional opportunity to accurately identify the product of interest as authentic. In some examples, such information hiding facilitates consumer promotional activities, such as encoding particular winning lottery "tickets" into the product genome, thereby allowing purchasers of the product to identify a winning match.

Figure 3:
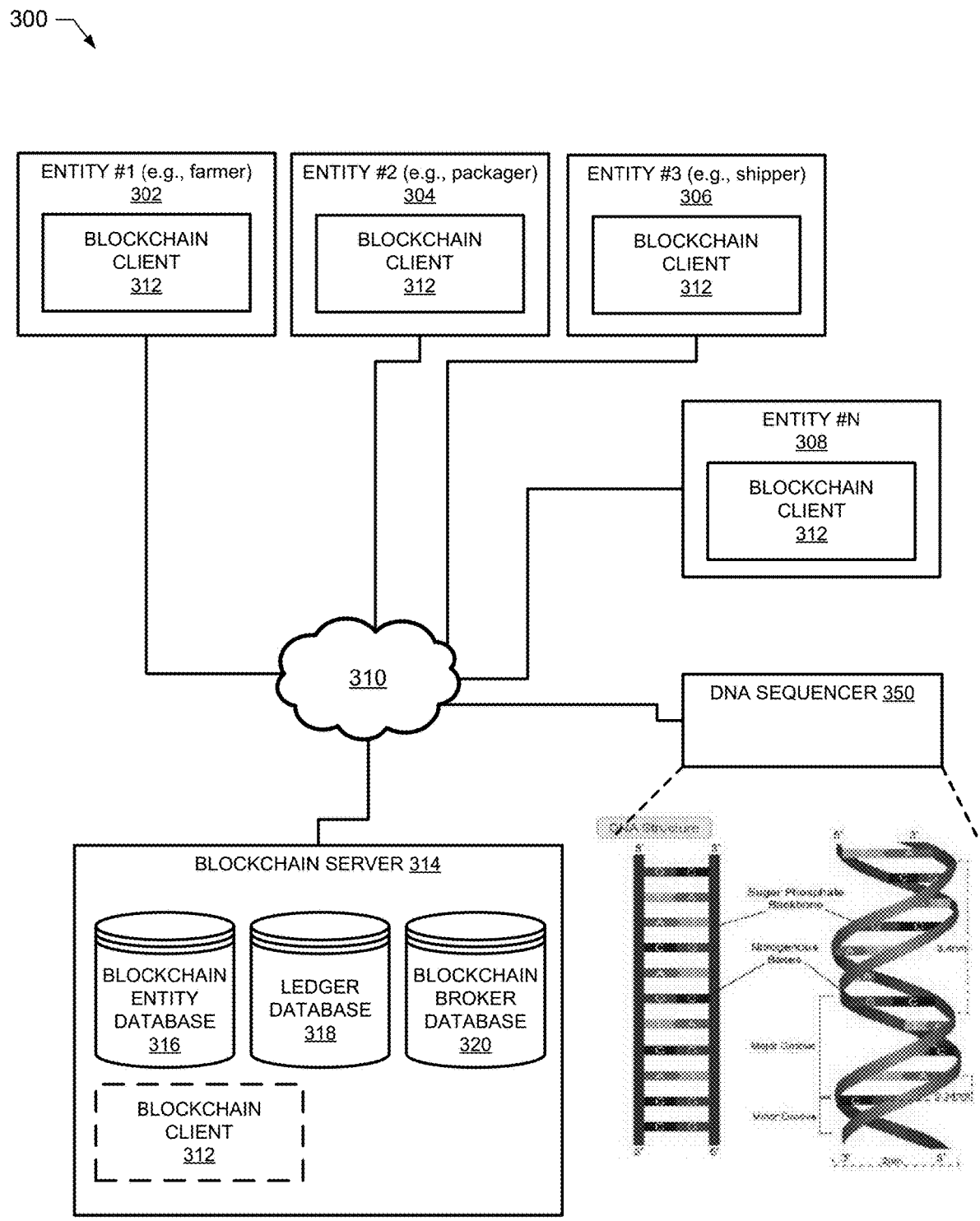
FIG. 3 is a schematic illustration of an example blockchain network environment constructed in accordance with the teachings of this disclosure to track a provenance of goods.

FIG. 3 illustrates an example blockchain network environment 300. In the illustrated example of FIG. 3, an example first entity 302 (e.g., a farmer of the example first provenance stage 102), an example second entity 304 (e.g., a packaging company of the example second provenance stage 104), an example third entity 306 (e.g., a shipping company of the example third provenance stage 106), and an example Nth entity 308 is shown communicatively connected to a network 310. Each of the example first entity 302, the example second entity 304, the example third entity 306 and the example Nth entity 308 includes an example blockchain client 312 communicatively connected to the example network 310. The example network 310 is also communicatively connected to an example blockchain server 314. The example blockchain server 314 includes, in part, an example blockchain entity database 316, an example ledger database 318 and an example blockchain broker database 320. In some examples, the example ledger database 318 is part of the example blockchain entity database 316. In some examples, the blockchain entity database 316, the example ledger database 318 and/or the example blockchain broker database 320 are located external to the example blockchain server 314. In some examples, the example blockchain client 312 and/or one or more components of the example blockchain client 312 resides within the example blockchain server 314. In such examples, a participating entity (e.g., the example first entity 302) provides its raw data to the example blockchain client 312 for processing on the example blockchain server 314. In some examples. "offloading" such processing requirements reduces a computational burden for the participating entities (e.g., the example first entity 302, the example second entity 304, etc.).

The illustrated example of FIG. 3 also includes an example DNA sequencer 350. The example DNA sequencer 350 may be invoked by the example blockchain client 312 and/or the example blockchain server 314 (e.g., via the example network 310) to perform DNA encoding/splicing and/or verification operations, as disclosed herein. In some examples, the DNA sequencer 350 is part of the example blockchain client 312 and/or the example blockchain server 314. In some examples the DNA sequencer 350 implements clustered regularly interspaced short palindromic repeats (CRISPR) techniques and/or systems to target and modify one or more genetic sequences of the product of interest. For example, portions of the product genome are targeted with an enzyme (e.g., Cas) to modify a genetic sequence of interest (e.g., removing and substituting a portion of junk DNA with one or more alternate sequences of product information (e.g., farmer ID, brand ID, etc. and/or information to aid in cryptographic authentication.

Figure 4:
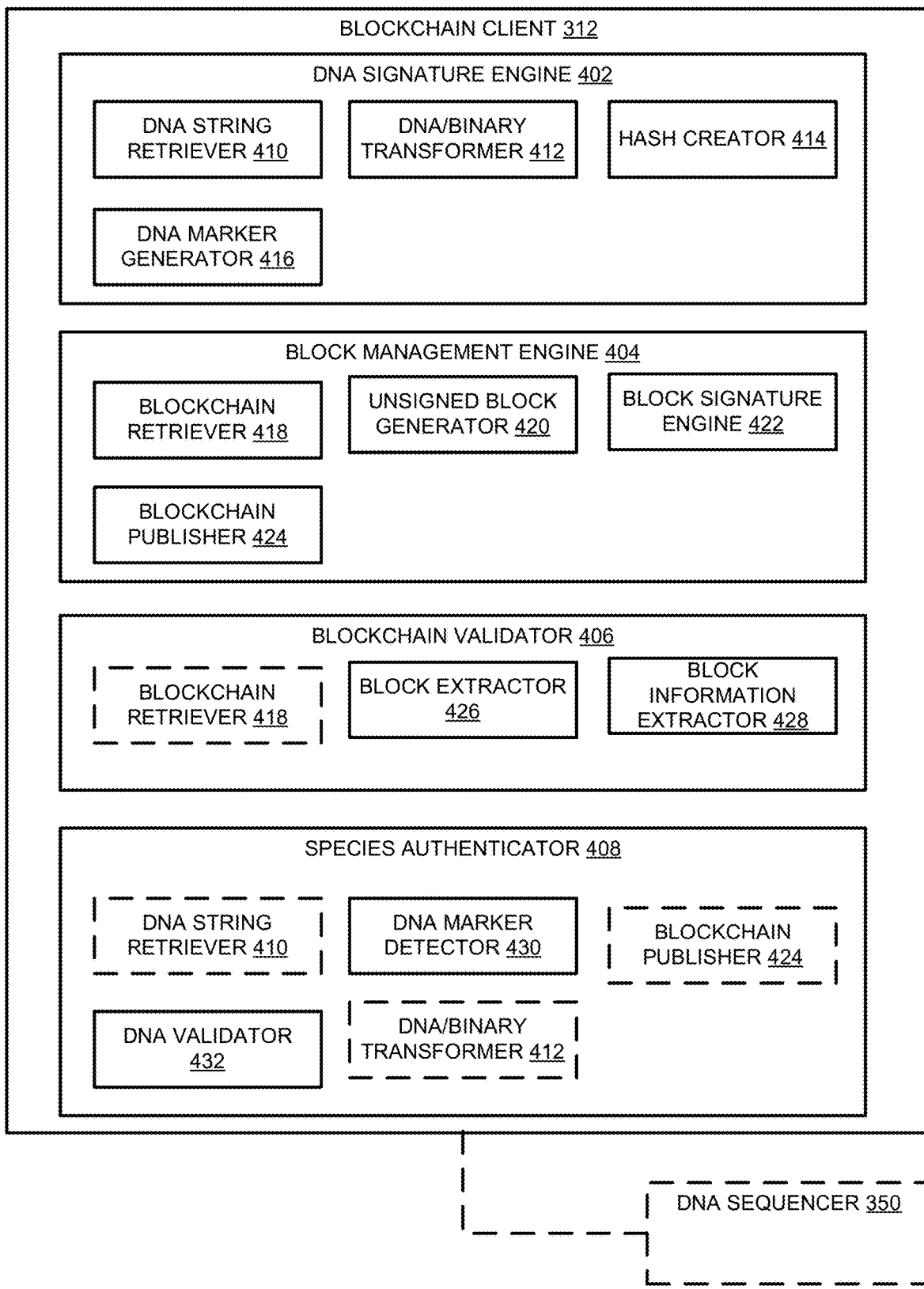
FIG. 4 is a schematic illustration of an example blockchain client of the example blockchain network environment of FIG. 3.

FIG. 4 illustrates additional detail of the example blockchain client 312 of FIG. 3. In the illustrated example of FIG. 4, the blockchain client 312 includes an example DNA signature engine 402, an example block management engine 404, an example blockchain validator 406 and an example species authenticator 408. As described above, the example blockchain client 312 may also include the example DNA sequencer 350 of FIG. 3, or the example DNA sequencer 350 may be accessible via direct, wired or wireless connections (e.g., via the example network 310). The example DNA signature engine 402 includes an example DNA string retriever 410, an example DNA/binary transformer 412, an example hash creator 414 and an example DNA marker generator 416. The example block management engine 404 includes an example blockchain retriever 418, an example unsigned block generator 420, an example block signature engine 422 and an example blockchain publisher 424. The example blockchain validator 406 includes the example blockchain retriever 418, an example block extractor 426 and an example block information extractor 428. The example species authenticator 408 includes the example DNA string retriever 410, an example DNA marker detector 430, an example DNA validator 432, the example DNA/binary transformer 412, and the example blockchain publisher 424.

In operation, the example DNA signature engine 402 determines whether species signing is to occur and, if so, the example DNA string retriever 410 retrieves a DNA string of interest. The example DNA/binary transformer 412 translates the DNA string from its base representation (e.g., "A," "C," "T") to a binary string using the example translation table 204. The example hash creator 414 generates a hash of the binary string, and the example DNA/binary transformer 412 translates the hash from the binary representation back to a base representation using the example translation table 204. In some examples, the hash creator 414 generates a signature using the binary string (cleartext) and a private key. In some examples, the hash creator 414 generates a signature by first generating a hash of the binary string, and then applying the private key.

To aid in the identification of the base representation when it is spliced into the product, the example DNA marker generator 416 applies pre-markers and post-markers (e.g., a string of "T" bases) to the DNA base representation to create a DNA signature. The example DNA signature engine 402 maps and/or otherwise splices the DNA signature into the product.

In response to the example block management engine 404 receiving a request to generate a block (e.g., a block for the blockchain), the example block management engine 404 determines whether the request is associated with a new blockchain (e.g., a new blockchain to be built when the farmer provides product(s) to a subsequent entity), or whether the request is associated with an existing blockchain to be built-upon. In some examples, the block management engine 404 determines that the request is associated with a new blockchain because no previously generated pending blockchain ID has been created. In some examples, the block management engine 404 determines that the request is associated with an existing blockchain based on availability of the pending blockchain ID. In some examples, a subsequent entity retrieves and/or otherwise receives the pending blockchain ID from a previous entity that has handled and/or otherwise performed one or more processes on the product of interest. In the event the request is associated with a new blockchain, the example unsigned block generator 420 generates a first unsigned block to assemble raw data of the requesting entity. The example block management engine 404 then generates a pending blockchain identifier (ID) to aid in the identification of future block additions to the blockchain. For example, in the event the blockchain has not been expanded to include a target number of entities in an expected sequence (e.g., according to a ledger), then the example block management engine 404 associates the blockchain with the pending blockchain ID. However, when the target number of entities has expanded the blockchain to include their respective signed blocks, then the example block management engine 404 removes the pending blockchain ID, or appends the example pending blockchain ID with an indication that the blockchain is complete (e.g., appending "_FIN" to the end of the pending blockchain ID. In some examples, an indication that the blockchain is not complete (e.g., an absence of the appended "_FIN" indicator) helps to keep blockchain contents private from intermediate entities associated with the product provenance. For example, the blockchain validator 406 may prevent and/or otherwise block verification attempts of the product provenance to conceal entity "snooping" of the blockchain. In some examples, the blockchain validator 406 blocks access to the respective public keys of the one or more entities of the blockchain unless the example indication of blockchain completion (e.g., "_FIN") is present. However, when the example pending blockchain ID is appended with indication of completion (e.g., "_FIN"), then tee example blockchain validator 406 permits verification of the product provenance.

Figure 5:
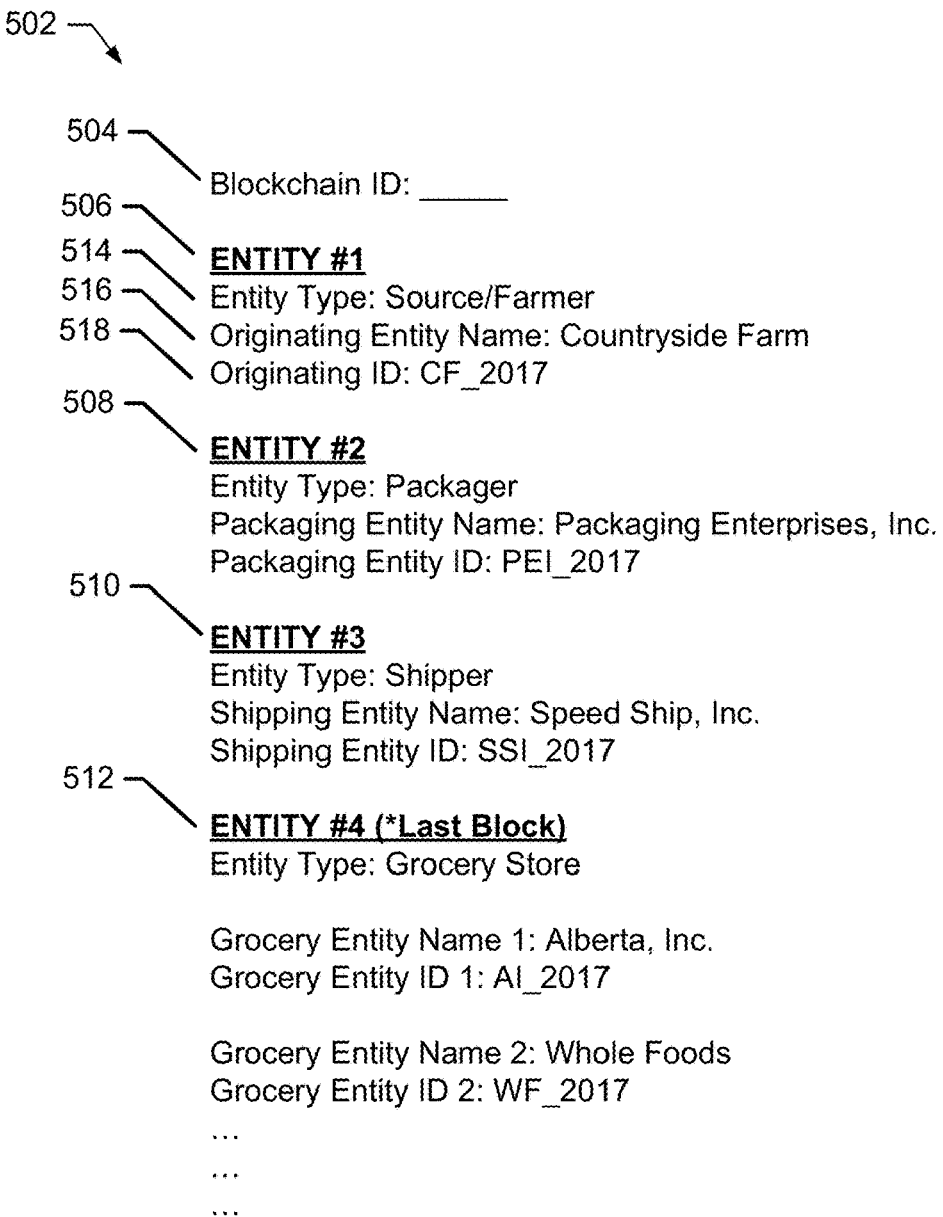
FIG. 5 is an example ledger generated by the example blockchain network environment of FIG. 3.

However, in the event the request to generate a block is associated with an existing (pending) blockchain (e.g., by referencing the pending blockchain ID), the example blockchain retriever 418 uses the pending blockchain ID to retrieve the blockchain from the example blockchain broker 320 of FIG. 3, which stores pending and completed blockchains. In some examples, the pending blockchain ID is provided from one entity to the next, such as the pending blockchain ID printed on goods/products as they change possession from one entity to the next. As used herein, a pending blockchain includes signed blocks that have not satisfied all inputs associated with a ledger that maps an expected sequence and identity of authorized entities. Accordingly, the example block signature engine 422 expands the blockchain by adding successive signed blocks thereto as entities contribute product processing data. FIG. 5 illustrates an example ledger 502. In the illustrated example of FIG. 5, the ledger 502 includes a blockchain ID 504 (e.g., a provisional blockchain ID, a completed blockchain ID with an appended "_FIN") to allow the example block management engine 404 to identify a corresponding ledger that discloses which entities are to participate in the blockchain. The example ledger 502 includes an example first entity 506, an example second entity 508, an example third entity 510 and an example fourth (last) entity 512 to participate in the blockchain. Each entity of the example ledger 502 identifies a corresponding entity type 514 (e.g., a farmer, a packager, a grocery store, etc.), an entity name 516 (e.g., Countryside Farms), and an entity identifier 518. In the illustrated example of FIG. 5, an originating identity indicates the first block in the example blockchain.

After the example unsigned block generator 420 generates a subsequent unsigned block, raw data from the responsible entity is assembled therein prior to being signed by the entity's private key with the example block signature engine 422. The example blockchain publisher 424 publishes the newly updated blockchain to the example blockchain broker database 320 so that it can be retrieved by one or more entities that need to build upon it. In the event the example blockchain publisher 424 determines that the most recently added signed block is associated with a last entity of the example ledger 502, then the blockchain is marked as completed rather than pending. In some examples, the blockchain publisher 424 publishes and/or otherwise stores the newly updated blockchain to the example blockchain broker database 320 in a manner that exhibits restricted access to one or more participating entities of the blockchain. For example, while a participating entity may acquire a stored blockchain for purposes of adding information to it (e.g., adding acquired sensor data related to product processing activities), such access may prevent evaluation and/or reading of one or more other blocks (e.g., signed blocks) stored within the blockchain. Additionally, unless a particular blockchain is associated with an indication of completion (e.g., "_FIN"), then the example blockchain client 312, the example blockchain server 314 and/or the example blockchain validator 406 prohibits and/or otherwise prevents access to the example blockchain entity database 316 that stores one or more public keys to allow cryptographic validation operations (e.g., to prevent "snooping" by one or more entities).

In addition to facilitating species signing and blockchain building, the example blockchain client 312 also performs blockchain validation. In some examples, an end-user or purchaser of the product invokes blockchain validation to verify and/or otherwise learn of the history (provenance) of the purchased product. In operation, the example blockchain retriever 418 retrieves a completed blockchain and the example block extractor 426 extracts a first signed block therein. The example block information extractor 428 extracts an originator ID and identifies a match in the example blockchain entity database 316. FIG. 6 illustrates an example entity data entry 602 of the example blockchain entity database 316. In the illustrated example of FIG. 6, the entity data entry 602 includes example information associated with the first participating entity of the blockchain. In particular, the example entity data entry 602 includes an example entity type 604, an example entity ID 606 and an example authorized public key 608 for the corresponding entity. As described in further detail below, the authorized public key 608 is used to validate one or more fields of information from the signed block. The example entity data entry 602 also includes an example first authorized sensor name 610, a corresponding public key for the first sensor 612, and an indication of whether the example first authorized sensor is compliant with TEE standards 614. One or more additional entries of authorized sensors, sensor types and corresponding public keys may be included in the example entity data entry 602.

The example entity data entry 602 also includes an example DNA marker public key 616 for validation of the product authenticity, as described in further detail below. The example entity data entry 602 also includes an example entity name 618, an example entity address 620, an example entity organic certification identifier (if any) 622, and an example entity phone number 624. In some examples, such information is useful to aid in product recall efforts.

The example block extractor 426 selects a field from the signed block, such as the example first signed block 132 of FIG. 1, and the example block chain validator 406 applies one or more cryptographic validation techniques on data stored therein. For example, because all of the needed public keys are available from the blockchain entity database 316, such keys may be applied to the signed sensor data to determine if valid. If such data is not valid, then the example blockchain validator 406 encodes an indication of authentication failure to the blockchain, otherwise an indication of authentication success is encoded.

In some examples, when a product has a DNA signature embedded therein, such as the example DNA signature 218 of FIG. 2, the example blockchain client 312 facilitates species validation of that product of interest. Similarly, when a product does not have an expected DNA signature embedded therein in a manner consistent with, for example, product labelling (e.g., a certified organic product from Countryside Farms), then the example client blockchain client 312 identifies a validation failure. For example, species validation performed by the example blockchain client 312 confirms that a purchased product has not been misrepresented by product labelling when the DNA signature 218 is validated.

In operation, the example species authenticator 418 determines whether a request is made to verify species authenticity. In response to such a request, the example DNA string retriever 410 retrieves a DNA sample from the product of interest, and the example DNA marker detector 430 detects pre-markers and post-markers to identify a DNA signature, such as the example DNA signature 218 of FIG. 2. As described above, the example species authenticator 408 may include one or more DNA decoding chipsets and/or otherwise invoke one or more DNA decoding chipsets, such as the example NanoPore® array chips. The example DNA/binary transformer 412 converts the detected DNA signature 218 to a binary representation, and the example DNA validator 432 performs validation of the extracted and transformed DNA signature 218. As described above, validation may be accomplished by the example DNA validator 432 utilizing a corresponding DNA marker public key 616 stored in the example blockchain entity database 316.

If the example DNA validator 432 calculates an indication of validation using the DNA marker public key 616, then the example DNA validator 432 encodes the blockchain with an indication of species validation, otherwise an indication of species difference and/or missing DNA signature is encoded into the blockchain. The example blockchain publisher 424 publishes the blockchain DNA validation results to the blockchain broker, thereby allowing reviewers of the product to analyze the provenance of the product. In some examples, provenance information for completed blockchains is stored in a cloud-based network and/or social media network. In some examples, completed blockchain provenance information is implemented in crowdsourcing applications where consumers share information on suppliers via the social medium. For any particular purchased product, changes or differences in soil conditions (e.g., droughts, greater/lesser amounts of pesticides, etc.) can be compared to previous harvests/batches of the purchased product, thereby providing a degree of insight into corresponding differences in taste, longevity, etc.

In some examples, end-users and/or purchasers of the product of interest may continue to add to the blockchain with information that was unavailable via previous entities/stages. For instance, an end-user may add to the product blockchain with information associated with taste, such as an increased bitterness of the product. The end-user, originating entity (e.g., farmer), shipping entity, etc. may use this information to investigate particular reasons why an increased bitterness may have occurred with this batch of product. In particular, stored sensor data may be analyzed and compared to one or more other batches where the increased bitterness did not occur in an effort to determine a cause of the increased bitterness (e.g., a reduction in a quantity of soil irrigation).

In some examples, the end-user may add to the blockchain with comments regarding an increased dirtiness or sand content of the product. For instance, the product flavor may be acceptable, but the end-user may require extra preparation time to clean the product of residual soil particulate. Such information may allow data to be gathered and/or otherwise compared to previous batches of the product of interest where such complaints did not occur. In some examples, the data may reveal that the current batch of product used a relatively lower quantity of rinse water during the packaging stage as compared to other batches devoid of cleanliness complaints.

Figure 7:
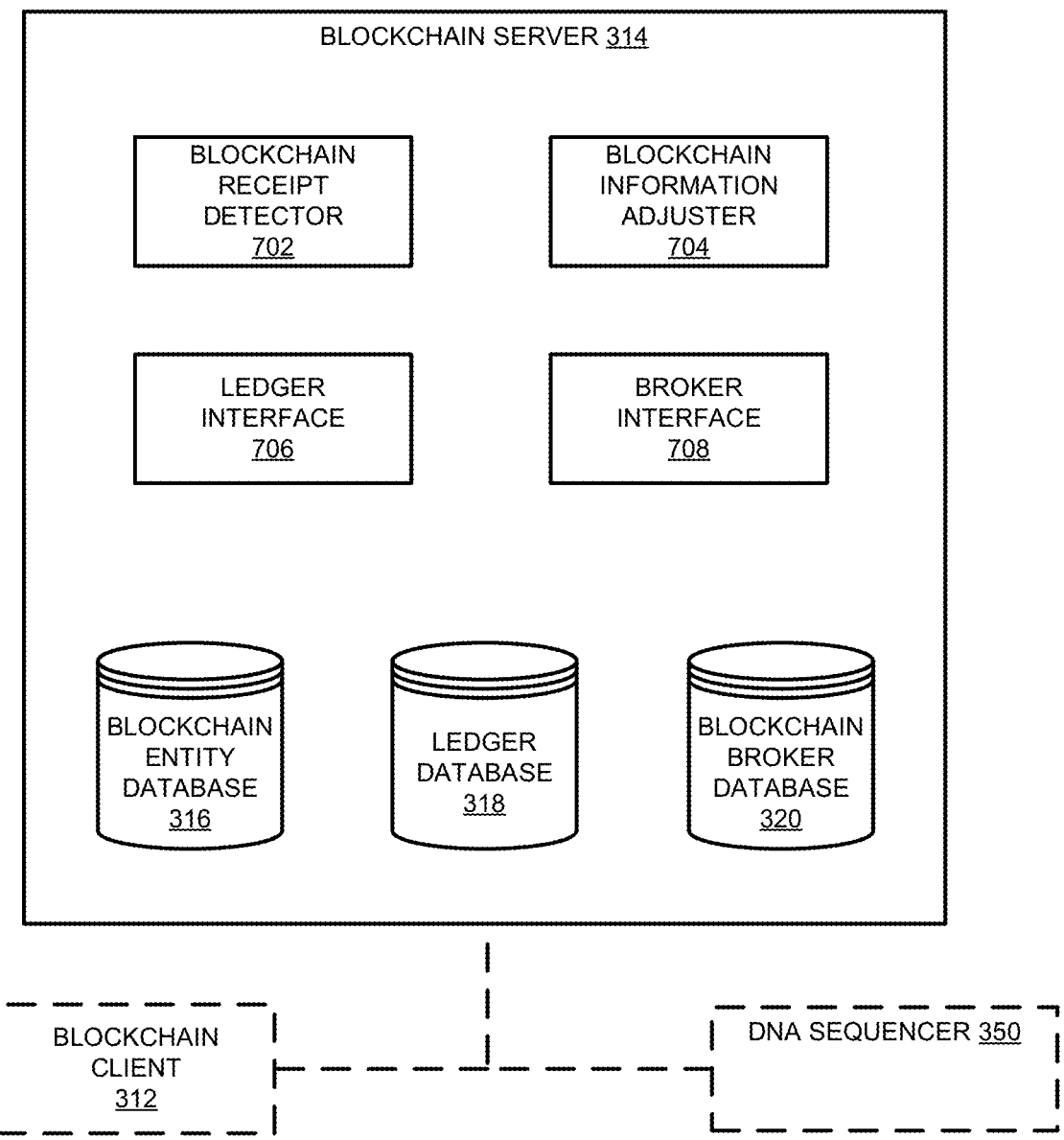
FIG. 7 is an example blockchain server of the example blockchain network environment of FIG. 3.

FIG. 7 illustrates additional detail of the example blockchain server 314 of FIG. 3. In the illustrated example of FIG. 7, the blockchain server 314 includes an example blockchain receipt detector 702, an example blockchain information adjuster 704, an example ledger interface 706, an example broker interface 708, the example blockchain entity database 316, the example ledger database 318 and the example blockchain broker database 320. In operation, the example blockchain receipt detector 702 detects the receipt of a blockchain, such as a newly generated blockchain from an originating entity, or detects the receipt of a request for a blockchain that may already be stored in the example blockchain broker database 320. In response to requests for blockchains stored in the example blockchain broker database 320, the example broker interface 708 retrieves the requested blockchain and transmits it to the sending party (e.g., one of the entities making the request via the example blockchain client 312).

In response to receiving and/or otherwise retrieving a blockchain from the example blockchain client 312, the example blockchain information adjuster 704 determines whether the received blockchain is new or previously stored in the example blockchain broker database 320. If new, such as an initial blockchain instance from an originating entity (e.g., a farmer), then the example ledger interface 706 identifies a corresponding originating participant from the example ledger 502. The example broker interface 708 stores the blockchain as a pending blockchain to the example blockchain broker database 320 with a pending blockchain ID.

In response to receiving and/or otherwise retrieving a blockchain from the example blockchain client 312 that is identified as having been previously stored in the example blockchain broker database 320 (e.g., based on a pending blockchain ID), the example blockchain information adjuster 704 identifies the sending participant/entity and the pending blockchain ID. The example ledger interface 706 determines whether the sending participant/entity is expected in the blockchain and, in some examples, verities whether the sending participant/entity is contributing to the blockchain in an expected order of the example ledger 502. For example, the example ledger interface 706 determines that contributions to the pending blockchain occur in a sequential order of a first entity (e.g., the example first entity 506 of FIG. 5), a second entity (e.g., the example second entity 508 of FIG. 5), a third entity (e.g., the example third entity 510 of FIG. 5), and then a fourth entity (e.g., the example fourth and final entity 512 of FIG. 5). In the event the example ledger interface identifies an out-of-order participation sequence of the sending participant, then the example blockchain server handles the anomaly by, for example, generating an indication of blockchain failure.

On the other hand, in the event the example ledger interface 706 determines that the sending participant/entity occurs in an expected order, it determines whether the last expected block of the blockchain has been completed. If so, then the example blockchain information adjuster 704 flags and/or otherwise encodes the blockchain with an indication of being complete. On the other hand, in the event the example ledger indicates that one or more additional blocks are to be added to the blockchain prior to completion, the example blockchain information adjuster 704 refrains from encoding any indication of completion, and the example broker interface 708 stores the blockchain to the example blockchain broker database 320.

While an example manner of implementing the blockchain network environment 300 of FIG. 3 is illustrated in FIGS. 1, 2 and 4-7, one or more of the elements, processes and/or devices illustrated in FIG. 3 may be combined, divided, re-arranged, omitted, eliminated and/or implemented in any other way. Further, the example soil IoT device 116, the example irrigation IoT device 120, the example TEE engine 128, 144, 160, the example DNA signature engine 125, 402, the example rinse water IoT device 140, the example shipping IoT device 156, the example first signature engine 130, the example second signature engine 146, the example third signature engine 162, the example DNA string retriever 410, the example DNA/binary transformer 412, the example hash creator 414, the example DNA marker generator 416, the example block management engine 404, the example blockchain retriever 418, the example unsigned block generator 420, the example block signature engine 422, the example blockchain publisher 424, the example blockchain validator 406, the example block extractor 426, the example block information extractor 428, the example species authenticator 408, the example DNA marker detector 430, the example DNA validator 432, the example blockchain receipt detector 702, the example blockchain information adjuster 704, the example ledger interface 706, the example broker interface 708, the example blockchain entity database 316, the example ledger database 318, the example blockchain broker database 320 and/or, more generally, the example blockchain client 312 and/or the example blockchain server 314 of FIGS. 3, 4 and/or 7 may be implemented by hardware, software, firmware and/or any combination of hardware, software and/or firmware. Thus, for example, any of the example soil IoT device 116, the example irrigation IoT device 120, the example TEE engine 128, 144, 160, the example DNA signature engine 125, 402, the example rinse water IoT device 140, the example shipping IoT device 156, the example first signature engine 130, the example second signature engine 146, the example third signature engine 162, the example DNA string retriever 410, the example DNA/binary transformer 412, the example hash creator 414, the example DNA marker generator 416, the example block management engine 404, the example blockchain retriever 418, the example unsigned block generator 420, the example block signature engine 422, the example blockchain publisher 424, the example blockchain validator 406, the example block extractor 426, the example block information extractor 428, the example species authenticator 408, the example DNA marker detector 430, the example DNA validator 432, the example blockchain receipt detector 702, the example blockchain information adjuster 704, the example ledger interface 706, the example broker interface 708, the example blockchain entity database 316, the example ledger database 318, the example blockchain broker database 320 and/or, more generally, the example blockchain client 312 and/or the example blockchain server 314 of FIGS. 3, 4 and/or 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example soil IoT device 116, the example irrigation IoT device 120, the example TEE engine 128, 144, 160, the example DNA signature engine 125, 402, the example rinse water IoT device 140, the example shipping IoT device 156, the example first signature engine 130, the example second signature engine 146, the example third signature engine 162, the example DNA string retriever 410, the example DNA/binary transformer 412, the example hash creator 414, the example DNA marker generator 416, the example block management engine 404, the example blockchain retriever 418, the example unsigned block generator 420, the example block signature engine 422, the example blockchain publisher 424, the example blockchain validator 406, the example block extractor 426, the example block information extractor 428, the example species authenticator 408, the example DNA marker detector 430, the example DNA validator 432, the example blockchain receipt detector 702, the example blockchain information adjuster 704, the example ledger interface 706, the example broker interface 708, the example blockchain entity database 316, the example ledger database 318, the example blockchain broker database 320 and/or, more generally, the example blockchain client 312 and/or the example blockchain server 314 of FIGS. 3, 4 and/or 7 is/are hereby expressly defined to include a non-transitory computer readable storage device or storage disk such as a memory, a digital versatile disk (DVD), a compact disk (CD), a Blu-ray disk, etc. including the software and/or firmware. Further still, the example blockchain network environment 300 of FIG. 3 may include one or more elements, processes and/or devices in addition to, or instead of, those illustrated in FIGS. 1, 2 and 4-7, and/or may include more than one of any or all of the illustrated elements, processes and devices.

Flowcharts representative of example machine readable instructions for implementing the blockchain network environment 300 of FIG. 3 is shown in FIGS. 8-12. In these examples, the machine readable instructions comprise program(s) for execution by a processor such as the processor 1312 shown in the example processor platform 1300 discussed below in connection with FIG. 13. The programs may be embodied in software stored on a non-transitory computer readable storage medium such as a CD-ROM, a floppy disk, a hard drive, a digital versatile disk (DVD), a Blu-ray disk, or a memory associated with the processor 1312, but the entire program(s) and/or parts thereof could alternatively be executed by a device other than the processor 1312 and/or embodied in firmware or dedicated hardware. Further, although the example program(s) is/are described with reference to the flowcharts illustrated in FIGS. 8-12, many other methods of implementing the example blockchain network environment 300 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 8:
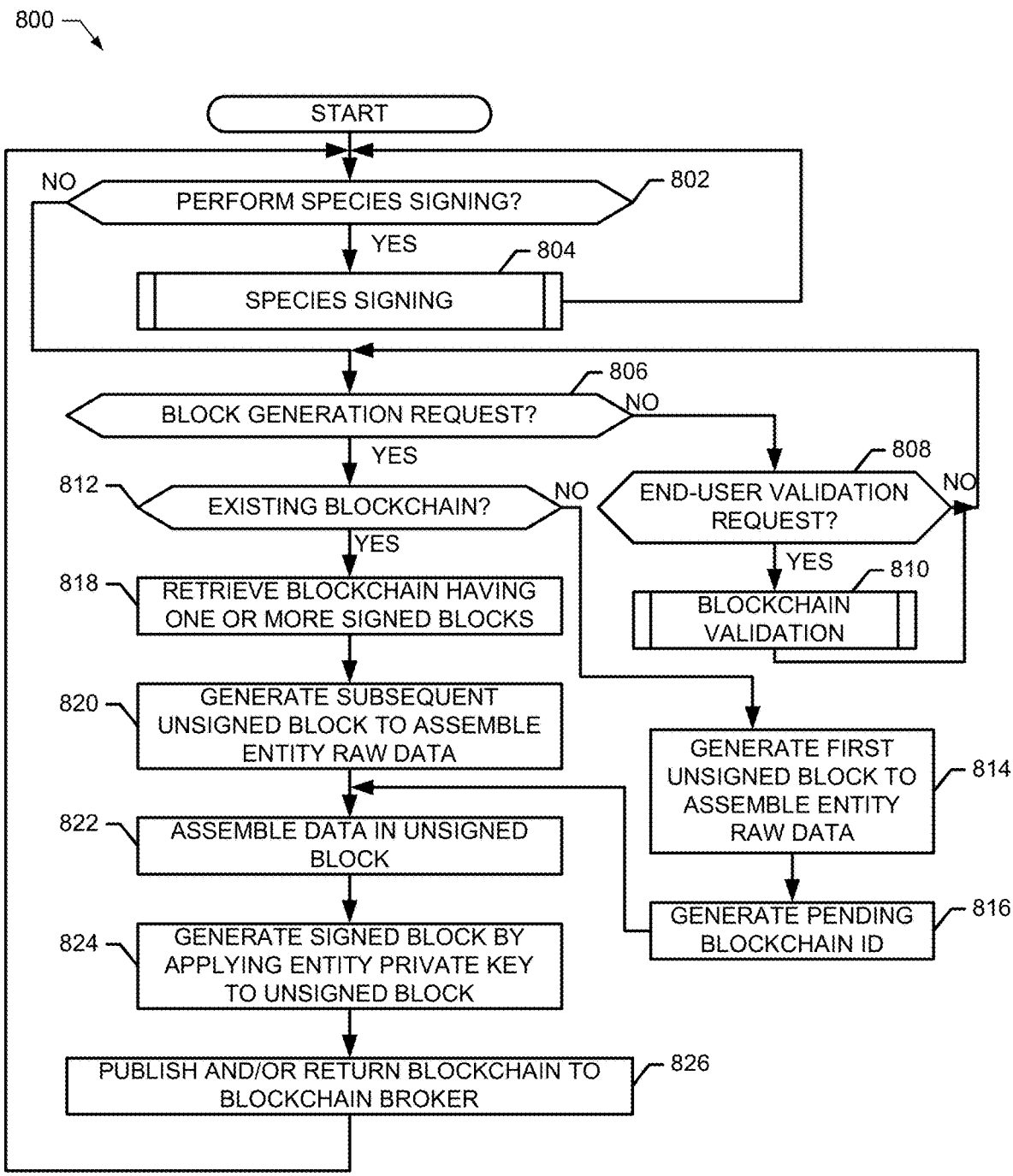
FIGS. 8-12 are flowcharts representative of example machine readable instructions that may be executed to implement the example blockchain network environment of FIG. 3 to track a provenance of goods.

The program 800 of FIG. 8 begins at block 802, where the example DNA signature engine 402 determines whether to perform species signing. If so, then the example DNA signature engine 402 initiates species signing (block 804), as described above and in further detail below. However, in the event that species signing (block 804) has already occurred with a product of interest, or is not considered in the blockchain of interest, the example block management engine 404 determines if a block generation request has occurred (block 806). If not, then the example blockchain validator 406 determines whether a blockchain validation request has occurred (block 808). If so, the example blockchain validator initiates blockchain validation (block 810), as described above and in further detail below.

If the example block management engine 404 determines that a block generation request has occurred (block 806), then the example block management engine 404 determines if the request is associated with an existing blockchain (block 812). If not an existing blockchain (block 812), then the request is associated with a new blockchain instance and the example unsigned block generator 420 generates a first unsigned block to assemble entity raw data (block 814). The example block management engine 404 generates a pending blockchain ID to associate with the newly generated blockchain (block 816).

If the example block management engine 404 determines that the block generation request is associated with an existing blockchain (block 812), then the example blockchain retriever 418 retrieves and/or otherwise "checks-out" a blockchain having one or more previously signed blocks, in which the blockchain is associated with a corresponding pending blockchain ID (block 818). The example unsigned block generator generates a new/subsequent unsigned block to assemble entity raw data (block 820) and assembles such data therein (block 822). The example block signature engine 422 generates a signed block by applying the private key of the entity to the unsigned block (block 824), and the example blockchain publisher 424 publishes and/or otherwise returns the updated and signed blockchain to the example blockchain broker database 320. Control then returns to block 802.

Figure 9:
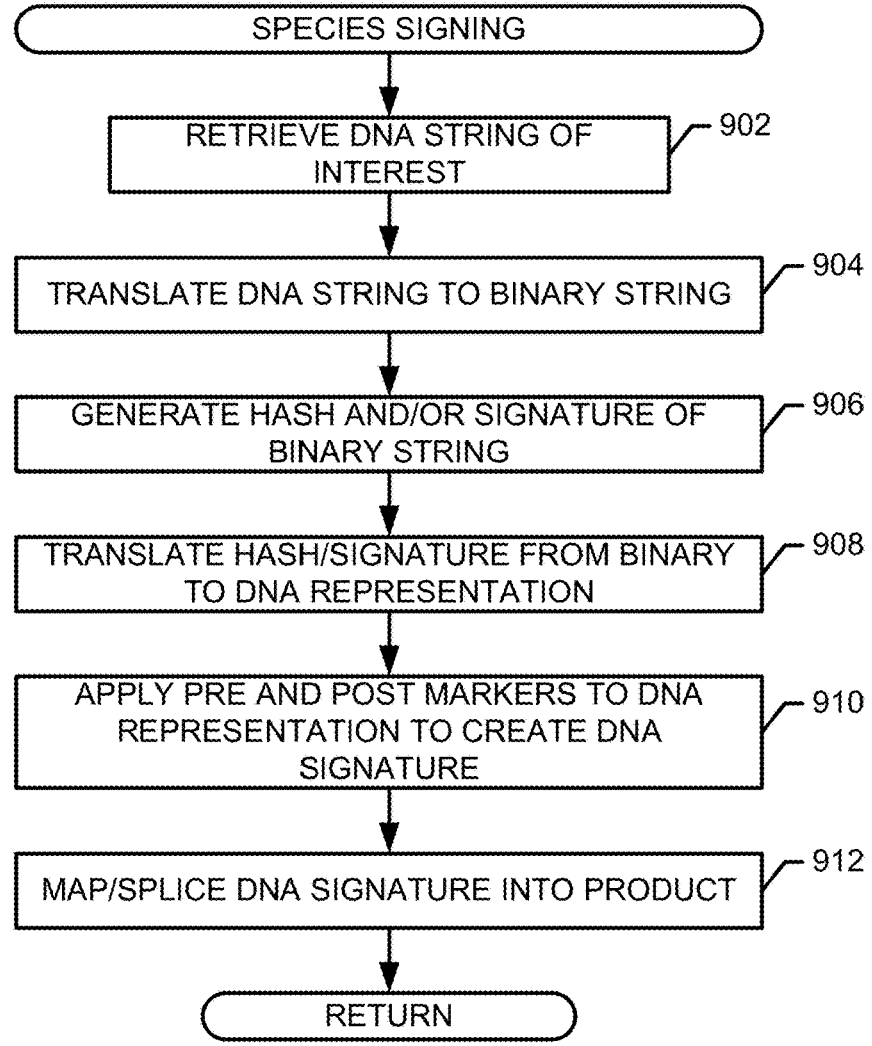

FIG. 9 illustrates additional detail in connection with species signing (block 804) invoked by the example DNA signature engine 402. In the illustrated example of FIG. 9, the example DNA string retriever 410 retrieves a DNA string of interest from the product of interest (e.g., in seed form prior to cultivation and/or reproduction) (block 902). The example DNA/binary transformer 412 translates an identified portion of the DNA string (e.g., a particular portion of the DNA string that is indicative of and/or otherwise unique to the species) to a binary string representation (block 904). The example hash creator 414 generates a hash of the binary string (block 906) using, for example, an SHA1, SHA2, etc., hashing algorithm. The example DNA/binary transformer 412 translates the hash of the binary string back to a DNA/base representation (block 908), and the example DNA marker generator 416 applies pre-markers and post-markers to the translated DNA/base representation to create a DNA signature (block 910), such as the example DNA signature 218 of FIG. 2. The DNA signature engine 402 maps and/or otherwise splices the DNA signature into the product (block 912).

Figure 10:
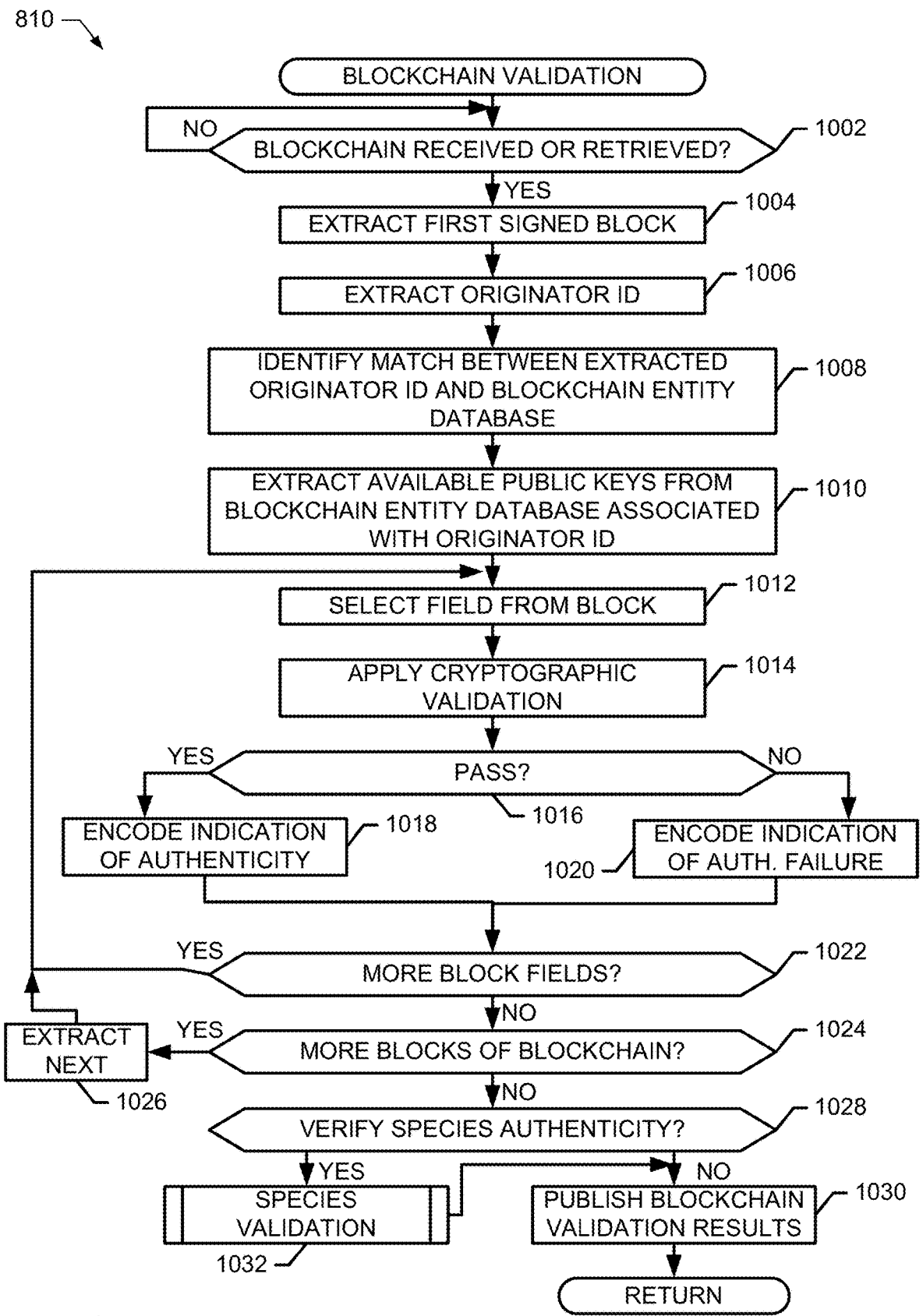

FIG. 10 illustrates additional detail in connection with blockchain validation (block 810). In the illustrated example of FIG. 10, the example blockchain retriever 418 determines if a completed blockchain has been received and/or otherwise retrieved (block 1002). If not, the example blockchain retriever 418 continues to wait, but upon receipt or retrieval of a blockchain of interest, the example block extractor 426 extracts a first signed block of the blockchain (block 1004). The example block information extractor 428 extracts an originator ID from the blockchain (block 1006) and identifies a match between the extracted originator ID and a corresponding entity in the example blockchain entity database 316 (block 1008), such as the example entity data entry 602 of FIG. 6. As described above, the example blockchain entity database 316 stores any number of public keys associated with an entity of interest and/or public keys of one or more sensors associated with the entity of interest, which are extracted by the example blockchain validator 406 (block 1010).

The example block extractor 426 selects a field from the selected signed block of the blockchain (block 1012), and using the available public keys associated with the entity of interest, the example blockchain validator 406 applies one or more validation operations on the field data within the block (block 1014). In the event the field information passes one or more validation tests (block 1016), then the example blockchain validator 406 encodes an indication of authenticity for the selected field of interest (block 1018), otherwise the example blockchain validator 406 encodes an indication of authenticity failure (block 1020). The example block extractor 426 determines if one or more fields still require a validation test (block 1022) and, if so, control returns to block 1012. Otherwise, the example block extractor 426 determines whether there are one or more additional blocks of the blockchain to analyze (block 1024). If so, the example block extractor 426 extracts a next available block (block 1026) and control returns to block 1012.

If all blocks have been analyzed (block 1024), then the example species authenticator 408 determines whether species authenticity is to be verified (block 1028). In some examples, the blockchain is not associated with one or more DNA signatures and, if so, the example blockchain publisher 424 publishes blockchain validation results to the example blockchain broker database 320 (block 1030). On the other hand, in the event species authenticity is to occur (block 1028), then the example species authenticator 408 invokes species validation (block 1032).

Figure 11:
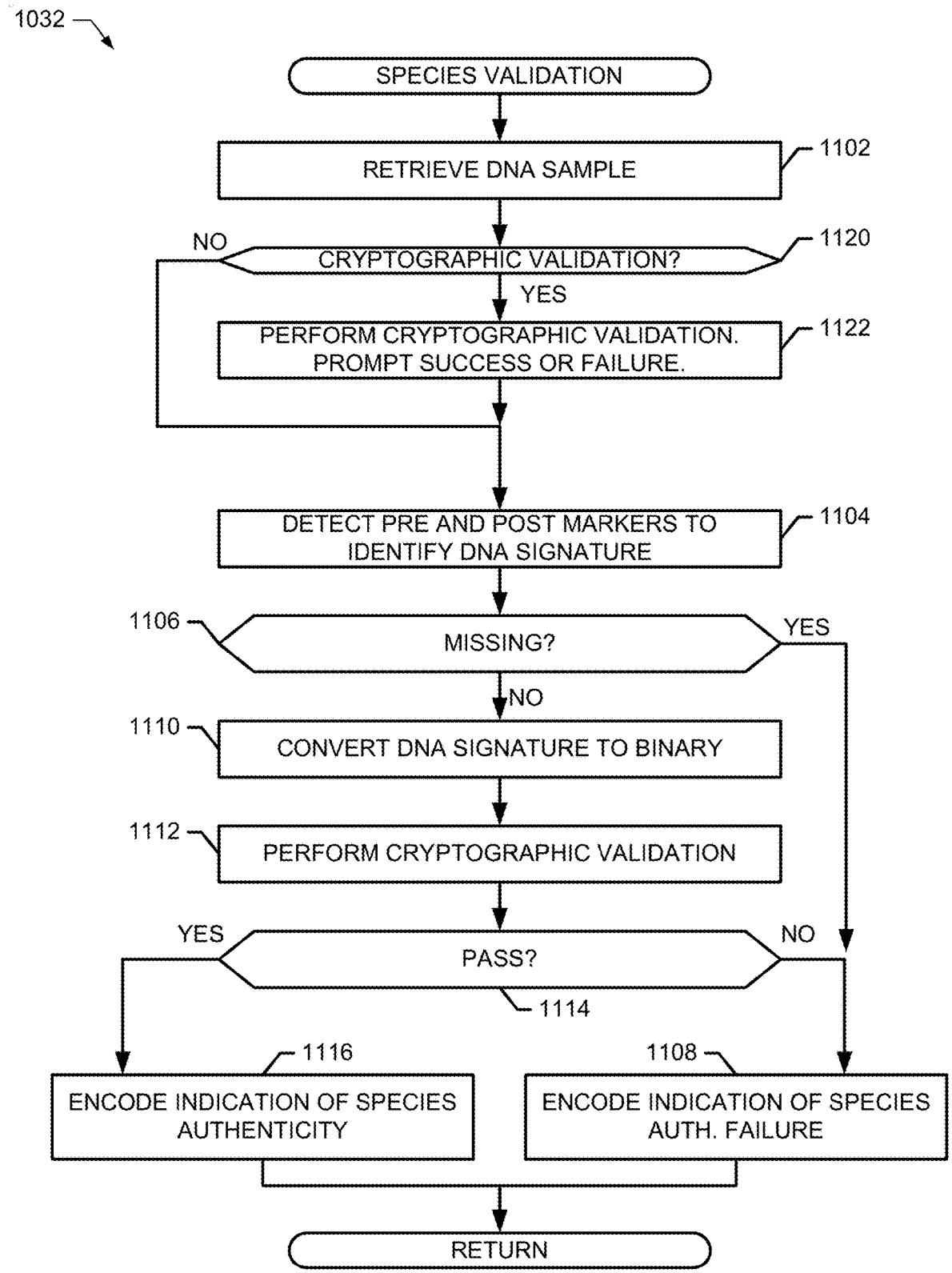

FIG. 11 illustrates additional detail in connection with species validation (block 1032) of FIG. 10. In the illustrated example of FIG. 11, the example DNA string retriever 410 retrieves a DNA sample from the product of interest (block 1102). The example species authenticator 408 determines whether cryptographic validation is to occur (block 1120) and, if so, the corresponding private key is applied to perform cryptographic validation (block 1122). Additionally, results of the cryptographic validation are reported as either a failure or a success (block 1122) and reported to the blockchain. In some examples, the species authenticator 408 determines that cryptographic validation is not to occur (block 1120) and, instead, program flow advances to block 1104. The example DNA marker detector 430 searches and detects pre-markers and post-markers to identify a DNA signature (block 1104), such as the example DNA signature 218 of FIG. 2. If the example DNA marker detector 430 fails to detect the markers (block 1106), then the example DNA validator 432 encodes an indication of species difference and/or validation failure to the blockchain (block 1108). However, when the example DNA marker detector 430 detects corresponding markers indicative of the DNA signature, the example DNA/binary transformer 412 converts the DNA signature to a binary representation (block 1110). The example DNA validator 432 performs one or more cryptographic validation operations/tests on the converted binary representation (block 1112), and failed results (block 1114) prompt the example DNA validator 432 to encode an indication of species difference and/or validation failure (block 1108), otherwise an indication of species authenticity is encoded to the example blockchain (block 1116).

Figure 12:
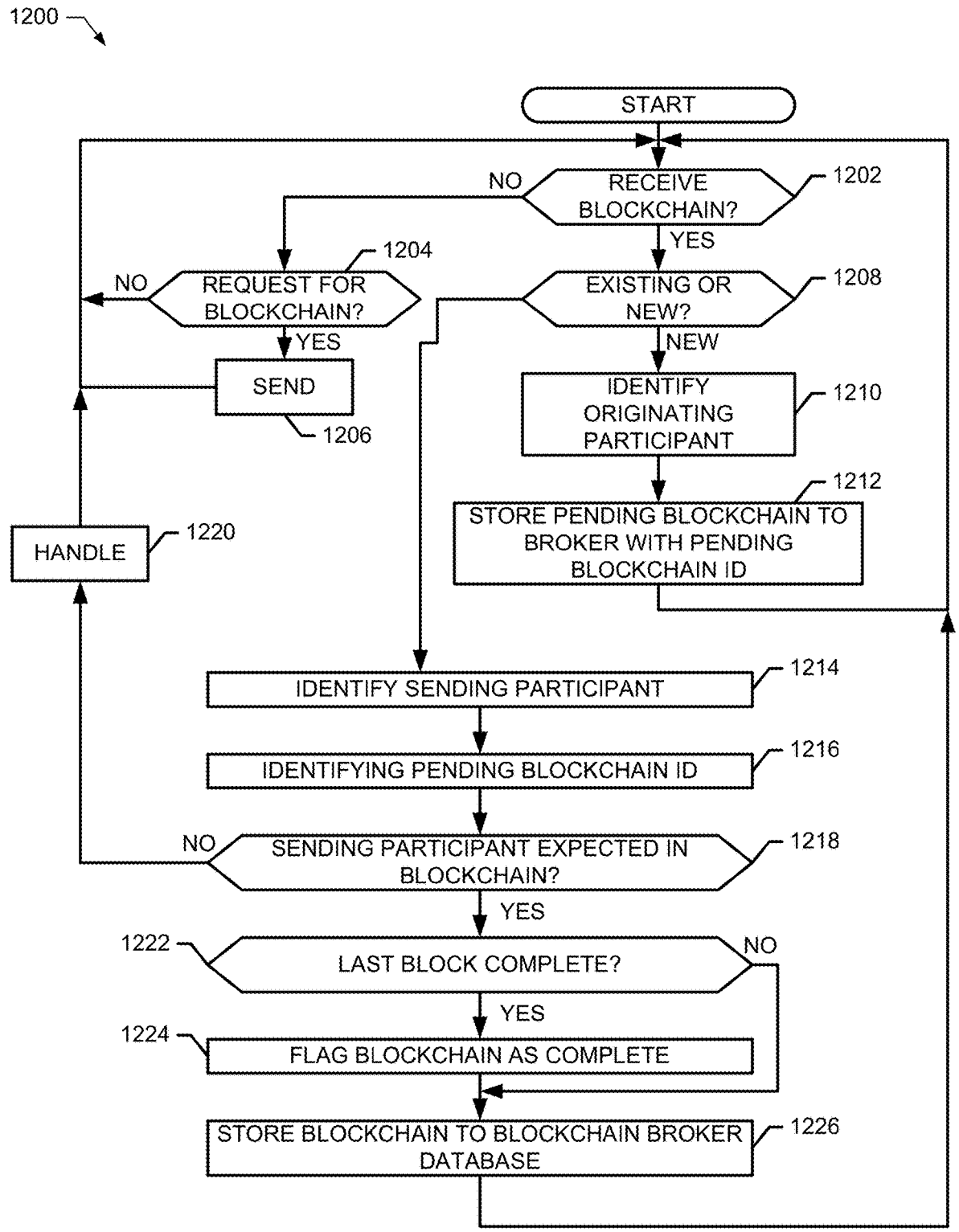

The program of FIG. 12 begins at block 1202, where the example blockchain receipt detector 702 determines if a blockchain has been received (e.g., from the example blockchain client 312). If not, then the example blockchain receipt detector 702 determines if a request for a blockchain has been received (block 1204), such as a request to retrieve a blockchain previously stored in the example blockchain broker database 320. If so, the example broker interface 708 sends the requested blockchain to the requesting party (block 1206).

In the event the example blockchain receipt detector 702 determines that a blockchain has been received (block 1202), then the example blockchain information adjuster 704 determines if the blockchain is newly created (e.g., by an example blockchain client 312 at an originating stage), or is associated with a previously created blockchain (e.g., a pending blockchain that has not yet completed all entity stages of the ledger) (block 1208). If new, then the example ledger interface 706 identities an originating participant (block 1210) and the example broker interface 708 stores the pending blockchain to the example blockchain broker database 320 with the pending blockchain ID (block 1212).

On the other hand, when an existing blockchain is received (block 1208), the example blockchain information adjuster 704 identifies the sending participant (block 1214) and identifies a corresponding pending blockchain ID (block 1216). The example ledger interface 706 determines if the identified sending participant is the next participant expected in the blockchain (block 1218) and, if not, the example blockchain server 314 handles the anomaly (block 1220) with, for example, a warning message or an encoded message on the blockchain. In the event the example ledger interface 706 determines that the sending participant is the next expected participant to build-upon the blockchain (block 1218), then the example ledger interface 706 determines whether the last block of the ledger has been completed (block 1222). If so, the example blockchain information adjuster 704 flags the blockchain as complete (block 1224), and the example broker interface 708 stores the blockchain to the example blockchain broker database 320 (block 1226).

Figure 13:
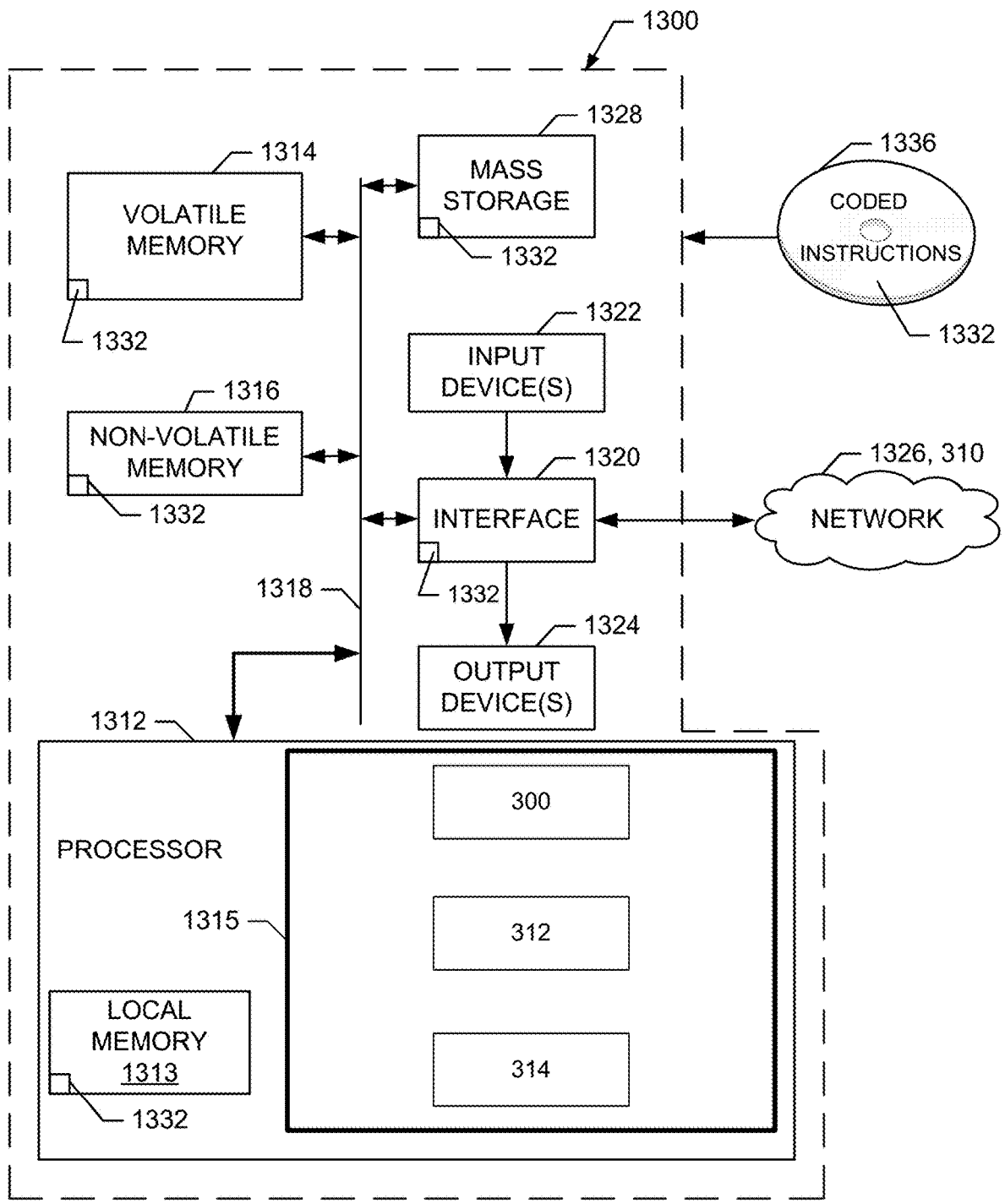
FIG. 13 is a block diagram of an example processor platform structured to execute the example machine readable instructions of FIGS. 8-12 to implement the example blockchain network environment of FIG. 3.

FIG. 13 is a block diagram of an example processor platform 1300 capable of executing the instructions of FIGS. 8-12 to implement the blockchain network environment 300 of FIG. 3. The processor platform 1300 can be, for example, a server, a personal computer, a mobile device (e.g., a cell phone, a smart phone, a tablet such as an iPad™, a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The hardware processor may be a semiconductor based (e.g., silicon based) device. In this example, the processor 1312 implements the example blockchain client 312, the example blockchain server 314 and, more generally, the example blockchain network environment 300. In the illustrated example of FIG. 13, the processor 1312 includes one or more example processing cores 1315 configured via example instructions 1332, which include the example instructions of FIGS. 8-12.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.)

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 8-12 may be stored in the mass storage device 1328, in the volatile memory 1314, in the non-volatile memory 1316, and/or on a removable tangible computer readable storage medium such as a CD or DVD.

Examples disclosed herein may apply to internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing, image classification (e.g., still image, streaming video, etc.), or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone, embedded device, or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements.

Backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LIE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices, such as over the backbone links, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, image classification, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

Clusters of IoT devices may be equipped to communicate with other IoT devices as well as with a cloud network. This may allow the IoT devices to form an ad-hoc network between the devices, allowing them to function as a single device, which may be termed a fog device.

A cloud computing network in communication with a mesh network of IoT devices may operate as a fog device at the edge of the cloud computing network. The mesh network of IoT devices may be termed a fog, operating at the edge of the cloud.

The fog may be considered to be a massively interconnected network wherein a number of IoT devices are in communications with each other, for example, by radio links. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices include gateways, data aggregators, and sensors, although any combinations of IoT devices and functionality may be used. The gateways may be edge devices that provide communications between the cloud and the fog, and may also provide the backend process function for data obtained from sensors, such as motion data, flow data, temperature data, and the like. The data aggregators may collect data from any number of the sensors, and perform the back end processing function for the analysis. The results, raw data, or both may be passed along to the cloud through the gateways. The sensors may be full IoT devices, for example, capable of both collecting data and processing the data. In some cases, the sensors may be more limited in functionality, for example, collecting the data and allowing the data aggregators or gateways to process the data.

Communications from any IoT device may be passed along a convenient path (e.g., a most convenient path) between any of the IoT devices to reach the gateways. In these networks, the number of interconnections provide substantial redundancy, allowing communications to be maintained, even with the loss of a number of IoT devices. Further, the use of a mesh network may allow IoT devices that are very low power or located at a distance from infrastructure to be used, as the range to connect to another IoT device may be much less than the range to connect to the gateways.

The fog provided from these IoT devices may be presented to devices in the cloud, such as a server, as a single device located at the edge of the cloud, e.g., a fog device. In this example, the alerts coming from the fog device may be sent without being identified as coming from a specific IoT device within the fog. In this fashion, the fog may be considered a distributed platform that provides computing and storage resources to perform processing or data-intensive tasks such as data analytics, data aggregation, and machine-learning, among others.

In some examples, the IoT devices may be configured using an imperative programming style, e.g., with each IoT device having a specific function and communication partners. However, the IoT devices forming the fog device may be configured in a declarative programming style, allowing the IoT devices to reconfigure their operations and communications, such as to determine needed resources in response to conditions, queries, and device failures. As an example, a query from a user located at a server about the operations of a subset of equipment monitored by the IoT devices may result in the fog device selecting the IoT devices, such as particular sensors, needed to answer the query. The data from these sensors may then be aggregated and analyzed by any combination of the sensors, data aggregators, or gateways, before being sent on by the fog device to the server to answer the query. In this example, IoT devices in the fog may select the sensors used based on the query, such as adding data from flow sensors or temperature sensors. Further, if some of the IoT devices are not operational, other IoT devices in the fog device may provide analogous data, if available.

From the foregoing, it will be appreciated that example methods, systems, apparatus and articles of manufacture have been disclosed that provide a purchasing consumer or other party with an ability to identify a provenance of purchased and/or otherwise acquired goods. Examples disclosed herein reduce and/or otherwise eliminate a possibility of an entity handling the goods to spoof or misrepresent the purchased goods and/or the handling data associated with the purchased goods. Examples disclosed herein also enable purchasing consumers to validate that the purchased goods are authentically sourced from an expected entity, such as a particular farm, a particular farmer, a particular breeder, etc. Examples disclosed herein embed and/or otherwise splice a signature of a portion of DNA into the goods prior to purchase, and enable extraction and cryptographic validation of the embedded signature for authentication purposes.

Example methods, systems, apparatus and articles of manufacture to track a provenance of goods are disclosed herein. Some such examples and combinations thereof include the following.

Example 1 is an apparatus to verify a product provenance, the apparatus including an unsigned block generator to generate a first unsigned block to store first processing data associated with the product by a first entity, a block signature engine to sign the first unsigned block with a first private key to generate a blockchain having a first signed block, the unsigned block generator to generate a second unsigned block in response to a second entity generating second processing data associated with the product by the second entity, the block signature engine to expand the blockchain by signing the second unsigned block with a second private key to generate a second signed block within the blockchain, and a blockchain validator to verify the product provenance by validating the first processing data and the second processing data using respective public keys associated with the first entity and the second entity.

Example 2 includes the apparatus as defined in example 1, further including a block management engine to associate the blockchain with a pending blockchain identifier when a target number of entities has not expanded the blockchain with respective signed blocks.

Example 3 includes the apparatus as defined in example 2, wherein the blockchain validator is to prevent verification of the product provenance when the pending blockchain ID includes an incomplete blockchain status indicator.

Example 4 includes the apparatus as defined in example 1, further including a deoxyribonucleic acid (DNA) string retriever to retrieve a portion of a DNA string from the product, and a DNA/binary transformer to translate the portion to a binary string.

Example 5 includes the apparatus as defined in example 4, further including a hash creator to generate a signature of the binary string, the DNA/binary transformer to translate the signature of the binary string to a signed DNA representation.

Example 6 includes the apparatus as defined in example 5, further including a DNA marker generator to apply pre-markers and post-markers to the signed DNA representation to generate a DNA signature.

Example 7 includes the apparatus as defined in example 6, further including a DNA signature engine to splice the DNA signature into the product.

Example 8 includes the apparatus as defined in example 7, further including a DNA validator to validate a binary representation of the DNA representation of the DNA signature with a public key, the public key paired with a private key used to generate the signature of the binary string.

Example 9 includes the apparatus as defined in any one of examples 1-8, further including a blockchain publisher to store the blockchain with restricted access by the first and second entity when the blockchain ID includes an incomplete access indicator.

Example 10 includes the apparatus as defined in any one of examples 1-8, further including a ledger to identify a plurality of participating entities of the blockchain.

Example 11 includes the apparatus as defined in any one of examples 1-8, further including a ledger to identify an expected processing order of a plurality of participating entities of the blockchain.

Example 12 includes the apparatus as defined in any one of examples 1-8, further including a blockchain entity storage to identify a plurality of public keys associated with a plurality of participating entities of the blockchain.

Example 13 is an apparatus to generate a provenance blockchain, the apparatus including a blockchain retriever to retrieve a blockchain based on a pending blockchain identifier, an unsigned block generator to generate a first unsigned block to store processing data associated with products processed by a first entity, a block signature engine to expand the blockchain with the processing data by the first entity by signing the first unsigned block with a private key associated with the entity, and a blockchain publisher to publish the expanded blockchain to a blockchain broker.

Example 14 includes the apparatus as defined in example 13, wherein the retrieved blockchain includes a plurality of signed blocks from a plurality of entities that have previously stored processing data associated with the products.

Example 15 includes the apparatus as defined in example 14, further including a blockchain validator to extract public keys associated with the plurality of entities that have previously stored processing data to the blockchain.

Example 16 includes the apparatus as defined in example 15, wherein the blockchain validator is to apply respective ones of the public keys to respective ones of the plurality of signed blocks within the blockchain to extract the processing data stored therein.

Example 17 includes the apparatus as defined in example 15, wherein the blockchain validator is to block access to the public keys when the pending blockchain identifier does not include an indication of blockchain completion.

Example 18 includes the apparatus as defined in any one of examples 13-17, further including a ledger to identify a plurality of participating entities of the blockchain.

Example 19 includes the apparatus as defined in any one of examples 13-17, further including a ledger to identify an expected processing order of a plurality of participating entities of the blockchain.

Example 20 is a computer-implemented method to verify a product provenance, the method including generating, by executing an instruction with a processor, a first unsigned block to store first processing data associated with the product by a first entity, signing, by executing an instruction with the processor, the first unsigned block with a first private key to generate a blockchain having a first signed block, generating, by executing an instruction with the processor, a second unsigned block in response to a second entity generating second processing data associated with the product by the second entity, expanding, by executing an instruction with the processor, the blockchain by signing the second unsigned block with a second private key to generate a second signed block within the blockchain, and verifying, by executing an instruction with the processor, the product provenance by validating the first processing data and the second processing data using respective public keys associated with the first entity and the second entity.

Example 21 includes the method as defined in example 20, further including associating the blockchain with a pending blockchain identifier when a target number of entities has not expanded the blockchain with respective signed blocks.

Example 22 includes the method as defined in example 21, further including preventing verification of the product provenance when the pending blockchain ID includes an incomplete blockchain status indicator.

Example 23 includes the method as defined in example 20, further including retrieving a portion of a deoxyribonucleic acid (DNA) string from the product, and translating the portion to a binary string.

Example 24 includes the method as defined in example 23, further including generating a signature of the binary string, and translating the signature of the binary string to a signed DNA representation.

Example 25 includes the method as defined in example 24, further including applying pre-markers and post-markers to the signed DNA representation to generate a DNA signature.

Example 26 includes the method as defined in example 25, further including splicing the DNA signature into the product.

Example 27 includes the method as defined in example 26, further including validating a binary representation of the DNA representation of the DNA signature with a public key, the public key paired with a private key used to generate the signature of the binary string.

Example 28 includes the method as defined in any one of examples 20-27, further including storing the blockchain with restricted access by the first and second entity when the blockchain ID includes an incomplete access indicator.

Example 29 includes the method as defined in any one of examples 20-27, further including identifying a plurality of participating entities of the blockchain with a ledger.

Example 30 includes the method as defined in any one of examples 20-27, further including identifying an expected processing order of a plurality of participating entities of the blockchain with a ledger.

Example 31 includes the method as defined in any one of examples 20-27, further including identifying a plurality of public keys associated with a plurality of participating entities of the blockchain with a blockchain entity storage.

Example 32 is a tangible computer-readable medium comprising instructions that, when executed, cause a processor to, at least generate a first unsigned block to store first processing data associated with the product by a first entity, sign the first unsigned block with a first private key to generate a blockchain having a first signed block, generate a second unsigned block in response to a second entity generating second processing data associated with the product by the second entity, expand the blockchain by signing the second unsigned block with a second private key to generate a second signed block within the blockchain, and verify the product provenance by validating the first processing data and the second processing data using respective public keys associated with the first entity and the second entity.

Example 33 includes the computer-readable medium as defined in example 32, wherein the instructions, when executed, further cause the processor to associate the blockchain with a pending blockchain identifier when a target number of entities has not expanded the blockchain with respective signed blocks.

Example 34 includes the computer-readable medium as defined in example 33, wherein the instructions, when executed, further cause the processor to prevent verification of the product provenance when the pending blockchain ID includes an incomplete blockchain status indicator.

Example 35 includes the computer-readable medium as defined in example 32, wherein the instructions. When executed, further cause the processor to retrieve a portion of a deoxyribonucleic acid (DNA) string from the product, and translate the portion to a binary string.

Example 36 includes the computer-readable medium as defined in example 35, wherein the instructions, when executed, further cause the processor to generate a signature of the binary string, and translate the signature of the binary string to a signed DNA representation.

Example 37 includes the computer-readable medium as defined in example 36, wherein the instructions, when executed, further cause the processor to apply pre-markers and post-markers to the signed DNA representation to generate a DNA signature.

Example 38 includes the computer-readable medium as defined in example 37, wherein the instructions, when executed, further cause the processor to splice the DNA signature into the product.

Example 39 includes the computer-readable medium as defined in example 38, wherein the instructions, when executed, further cause the processor to validate a binary representation of the DNA representation of the DNA signature with a public key, the public key paired with a private key used to generate the signature of the binary string.

Example 40 includes the computer-readable medium as defined in examples 32-39, wherein the instructions, when executed, further cause the processor to store the blockchain with restricted access by the first and second entity when the blockchain ID includes an incomplete access indicator.

Example 41 includes the computer-readable medium as defined in examples 32-39, wherein the instructions, when executed, further cause the processor to identify a plurality of participating entities of the blockchain with a ledger.

Example 42 includes the computer-readable medium as defined in examples 32-39, wherein the instructions, when executed, further cause the processor to identify an expected processing order of a plurality of participating entities of the blockchain with a ledger.

Example 43 includes the computer-readable medium as defined in examples 32-39, wherein the instructions, when executed, further cause the processor to identify a plurality of public keys associated with a plurality of participating entities of the blockchain with a blockchain entity storage.

Example 44 is a system to verify a product provenance, the system including means for generating a first unsigned block to store first processing data associated with the product by a first entity, means for signing the first unsigned block with a first private key to generate a blockchain having a first signed block, means for generating generate a second unsigned block in response to a second entity generating second processing data associated with the product by the second entity, means for expanding the blockchain by signing the second unsigned block with a second private key to generate a second signed block within the blockchain, and means for verifying the product provenance by validating the first processing data and the second processing data using respective public keys associated with the first entity and the second entity.

Example 45 includes the system as defined in example 44, further including means for associating the blockchain with a pending blockchain identifier when a target number of entities has not expanded the blockchain with respective signed blocks.

Example 46 includes the system as defined in example 45, further including means for preventing verification of the product provenance when the pending blockchain ID includes an incomplete blockchain status indicator.

Example 47 includes the system as defined in example 44, further including means for retrieving a portion of a deoxyribonucleic acid (DNA) string from the product, and translating the portion to a binary string.

Example 48 includes the system as defined in example 47, further including means for generating a signature of the binary string, and translating the signature of the binary string to a signed DNA representation.

Example 49 includes the system as defined in example 48, further including means for applying pre-markers and post-markers to the signed DNA representation to generate a DNA signature.

Example 50 includes the system as defined in example 49, further including means for splicing the DNA signature into the product.

Example 51 includes the system as defined in example 50, further including means for validating a binary representation of the DNA representation of the DNA signature with a public key, the public key paired with a private key used to generate the signature of the binary string.

Example 52 includes the system as defined in any one of examples 44-1, further including means for storing the blockchain with restricted access by the first and second entity when the blockchain ID includes an incomplete access indicator.

Example 53 includes the system as defined in any one of examples 44-51, further including means for identifying a plurality of participating entities of the blockchain with a ledger.

Example 54 includes the system as defined in any one of examples 44-51, further including means for identifying an expected processing order of a plurality of participating entities of the blockchain with a ledger.

Example 55 includes the system as defined in any one of examples 44-51, further including means for identifying a plurality of public keys associated with a plurality of participating entities of the blockchain.

Example 56 is a method to generate a provenance blockchain, the method including retrieving, by executing an instruction with a processor, a blockchain based on a pending blockchain identifier, generating, by executing an instruction with the processor, a first unsigned block to store processing data associated with products processed by a first entity, expanding, by executing an instruction with the processor, the blockchain with the processing data by the first entity by signing the first unsigned block with a private key associated with the entity, and publishing, by executing an instruction with the processor, the expanded blockchain to a blockchain broker.

Example 57 includes the method as defined in example 56, wherein the retrieved blockchain includes a plurality of signed blocks from a plurality of entities that have previously stored processing data associated with the products.

Example 58 includes the method as defined in example 57, further including extracting public keys associated with the plurality of entities that have previously stored processing data to the blockchain.

Example 59 includes the method as defined in example 58, further including applying respective ones of the public keys to respective ones of the plurality of signed blocks within the blockchain to extract the processing data stored therein.

Example 60 includes the method as defined in example 58, further including blocking access to the public keys when the pending blockchain identifier does not include an indication of blockchain completion.

Example 61 includes the method as defined in any one of examples 56-60, further including identifying a plurality of participating entities of the blockchain with a ledger.

Example 62 includes the method as defined in any one of examples 56-60, further including identifying an expected processing order of a plurality of participating entities of the blockchain with a ledger.

Example 63 is a tangible computer-readable medium including instructions that, when executed, cause a processor to, at least retrieve a blockchain based on a pending blockchain identifier, generate a first unsigned block to store processing data associated with products processed by a first entity, expand the blockchain with the processing data by the first entity by signing the first unsigned block with a private key associated with the entity, and publish the expanded blockchain to a blockchain broker.

Example 64 includes the computer-readable medium as defined in example 63, wherein the instructions, when executed, further cause the processor to identify a plurality of signed blocks from a plurality of entities that have previously stored processing data associated with the products.

Example 65 includes the computer-readable medium as defined in example 64, wherein the instructions, when executed, further cause the processor to extract public keys associated with the plurality of entities that have previously stored processing data to the blockchain.

Example 66 includes the computer-readable medium as defined in example 65, wherein the instructions, when executed, further cause the processor to apply respective ones of the public keys to respective ones of the plurality of signed blocks within the blockchain to extract the processing data stored therein.

Example 67 includes the computer-readable medium as defined in example 65, wherein the instructions. When executed, further cause the processor to block access to the public keys when the pending blockchain identifier does not include an indication of blockchain completion.

Example 68 includes the computer-readable medium as defined in any one of examples 63-67, wherein the instructions, when executed, further cause the processor to identify a plurality of participating entities of the blockchain.

Example 69 includes the computer-readable medium as defined in any one of examples 63-67, wherein the instructions, when executed, further cause the processor to identify an expected processing order of a plurality of participating entities of the blockchain.

Example 70 is a system to verify a product provenance, the system including means for retrieving a blockchain based on a pending blockchain identifier, means for generating a first unsigned block to store processing data associated with products processed by a first entity, means for expanding the blockchain with the processing data by the first entity by signing the first unsigned block with a private key associated with the entity, and means for publishing the expanded blockchain to a blockchain broker.

Example 71 includes the system as defined in example 70, further including means for identifying a plurality of signed blocks from a plurality of entities that have previously stored processing data associated with the products.

Example 72 includes the system as defined in example 71, further including means for extracting public keys associated with the plurality of entities that have previously stored processing data to the blockchain.

Example 73 includes the system as defined in example 72, further including means for applying respective ones of the public keys to respective ones of the plurality of signed blocks within the blockchain to extract the processing data stored therein.

Example 74 includes the system as defined in example 72, further including means for blocking access to the public keys when the pending blockchain identifier does not include an indication of blockchain completion.

Example 75 includes the system as defined in any one of examples 70-74, further including means for identifying a plurality of participating entities of the blockchain with a ledger.

Example 76 includes the system as defined in any one of examples 70-74, further including means for identifying an expected processing order of a plurality of participating entities of the blockchain.

Example 77 is a system to build a secure blockchain, the system including a first Internet of Things (IoT) device to acquire first processing data occurring with a first entity and associated with a product of interest at a first instance, a first block signature engine to sign a first block having the first processing data with a first private key to generate a blockchain, the first private key associated with the first entity, a first blockchain publisher to store the blockchain in a networked blockchain broker database, a second IoT device to acquire second processing data occurring with a second entity and associated with the product of interest at a second instance, a blockchain retriever to retrieve the blockchain from the networked blockchain broker database, a second block signature engine to sign a second block having the second processing data with a second private key to expand the blockchain, the second private key associated with the second entity, and a second blockchain publisher to store the expanded blockchain in the networked blockchain broker database.

Example 78 includes the system as defined in example 77, further including a first cryptographic engine within the first IoT device to sign the first processing data with a first IoT private key.

Example 79 includes the system as defined in example 78, wherein the first cryptographic engine is to sign the first processing data prior to storing the first processing data to a memory.

Example 80 includes the system as defined in example 77, wherein the second block signature engine is to sign the second block in combination with the contents of the first block.

Example 81 includes the system as defined in example 77, further including a blockchain validator to verify a product provenance of the expanded blockchain by unwrapping the expanded blockchain with public keys.

Example 82 includes the system as defined in example 81, wherein the blockchain validator is to extract the public keys from a blockchain entity database.

Example 83 includes the system as defined in example 82, wherein the blockchain validator is to permit extraction of the public keys when the expanded blockchain includes an indication of completion.

Example 84 is a method to secure a blockchain, the method including acquiring, by executing an instruction with a processor, first processing data from a first Internet of Things (IoT) device occurring with a first entity and associated with a product of interest at a first instance, signing, by executing an instruction with the processor, a first block having the first processing data with a first private key to generate a blockchain, the first private key associated with the first entity, storing, by executing an instruction with the processor, the blockchain in a networked blockchain broker database, acquiring, by executing an instruction with the processor, second processing data from a second IoT device occurring with a second entity and associated with the product of interest at a second instance, retrieving, by executing an instruction with the processor, the blockchain from the networked blockchain broker database, signing, by executing an instruction with the processor, a second block having the second processing data with a second private key to expand the blockchain, the second private key associated with the second entity, and storing, by executing an instruction with the processor, the expanded blockchain in the networked blockchain broker database.

Example 85 includes the method as defined in example 84, further including signing the first processing data with a first IoT private key with a first cryptographic engine within the first IoT device.

Example 86 includes the method as defined in example 85, further including signing the first processing data prior to storing the first processing data to a memory.

Example 87 includes the method as defined in example 84, further including signing the second block in combination with the contents of the first block.

Example 88 includes the method as defined in example 84, further including verifying a product provenance of the expanded blockchain by unwrapping the expanded blockchain with public keys.

Example 89 includes the method as defined in example 88, further including extracting the public keys from a blockchain entity database.

Example 90 includes the method as defined in example 89, further including permitting extraction of the public keys when the expanded blockchain includes an indication of completion.

Example 91 is a tangible computer-readable medium including instructions that, when executed, cause a processor to, at least acquire first processing data from a first Internet of Things (IoT) device occurring with a first entity and associated with a product of interest at a first instance, sign a first block having the first processing data with a first private key to generate a blockchain, the first private key associated with the first entity, store the blockchain in a networked blockchain broker database, acquire second processing data from a second IoT device occurring with a second entity and associated with the product of interest at a second instance, retrieve the blockchain from the networked blockchain broker database, sign a second block having the second processing data with a second private key to expand the blockchain, the second private key associated with the second entity, and store the expanded blockchain in the networked blockchain broker database.

Example 92 includes the computer-readable medium as defined in example 91, wherein the instructions, when executed, further cause the processor to sign the first processing data with a first IoT private key with a first cryptographic engine within the first IoT device.

Example 93 includes the computer-readable medium as defined in example 92, wherein the instructions, when executed, further cause the processor to sign the first processing data prior to storing the first processing data to a memory.

Example 94 includes the computer-readable medium as defined in example 91, wherein the instructions, when executed, further cause the processor to sign the second block in combination with the contents of the first block.

Example 95 includes the computer-readable medium as defined in example 91, wherein the instructions, when executed, further cause the processor to verify a product provenance of the expanded blockchain by unwrapping the expanded blockchain with public keys.

Example 96 includes the computer-readable medium as defined in example 95, wherein the instructions, when executed, further cause the processor to extract the public keys from a blockchain entity database.

Example 97 includes the computer-readable medium as defined in example 96, wherein the instructions, when executed, further cause the processor to permit extraction of the public keys when the expanded blockchain includes an indication of completion.

Example 98 is a system to build a secure blockchain, the system including means for acquiring first processing data with a first Internet of Things (IoT) device occurring with a first entity and associated with a product of interest at a first instance, means for signing a first block having the first processing data with a first private key to generate a blockchain, the first private key associated with the first entity, means for storing the blockchain in a networked blockchain broker database, means for acquiring second processing data with a second IoT device occurring with a second entity and associated with the product of interest at a second instance, means for retrieving the blockchain from the networked blockchain broker database, means for signing a second block having the second processing data with a second private key to expand the blockchain, the second private key associated with the second entity, and means for storing the expanded blockchain in the networked blockchain broker database.

Example 99 includes the system as defined in example 98, further including means for signing the first processing data with a first IoT private key.

Example 100 includes the system as defined in example 99, further including means for signing the first processing data prior to storing the first processing data to a memory.

Example 101 includes the system as defined in example 98, further including means for signing the second block in combination with the contents of the first block.

Example 102 includes the system as defined in example 98, further including means for verifying a product provenance of the expanded blockchain by unwrapping the expanded blockchain with public keys.

Example 103 includes the system as defined in example 102, further including means for extracting the public keys from a blockchain entity database.

Example 104 includes the system as defined in example 103, further including means for permitting extraction of the public keys when the expanded blockchain includes an indication of completion.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to verify a product provenance, the apparatus comprising:
    unsigned block generator circuitry to generate a first unsigned block to store first processing data associated with the product by a first entity, the unsigned block generator circuitry communicatively connected to the first entity and a second entity;
    block signature engine circuitry to sign the first unsigned block with a first private key to generate a blockchain having a first signed block, the block signature engine circuitry communicatively connected to the first entity and the second entity,
    the unsigned block generator circuitry to generate a second unsigned block in response to the second entity generating second processing data associated with the product by the second entity,
    the block signature engine circuitry to expand the blockchain by signing the second unsigned block with a second private key to generate a second signed block within the blockchain; and
    blockchain validator circuitry, communicatively connected to the first and second entities, to:
    block access to a first public key and a second public key corresponding to the first entity and the second entity, respectively, when an indication of completion of the blockchain is not present; and
    verify the product provenance by validating the first processing data and the second processing data using the respective public keys associated with the first entity and the second entity when the indication of completion of the blockchain is present.

2. The apparatus as defined in claim 1, further including block management engine circuitry to associate the blockchain with a pending blockchain identifier when a target number of entities has not expanded the blockchain with respective signed blocks.

3. The apparatus as defined in claim 2, wherein the blockchain validator circuitry is to prevent verification of the product provenance when the pending blockchain ID includes an incomplete blockchain status indicator.

4. The apparatus as defined in claim 1, further including:
    deoxyribonucleic acid (DNA) string retriever circuitry to retrieve a portion of a DNA string from the product; and
    DNA/binary transformer circuitry to translate the portion to a binary string.

5. The apparatus as defined in claim 4, further including hash creator circuitry to generate a signature of the binary string, the DNA/binary transformer circuitry to translate the signature of the binary string to a signed DNA representation using at least one of the first private key or the second private key.

6. The apparatus as defined in claim 5, further including DNA marker generator circuitry to apply pre-markers and post-markers to the signed DNA representation to generate a DNA signature.

7. The apparatus as defined in claim 6, further including DNA signature engine circuitry to splice the DNA signature into the product.

8. The apparatus as defined in claim 7, further including DNA validator circuitry to validate a binary representation of the DNA representation of the DNA signature with a third public key, the third public key paired with a private key used to generate the signature of the binary string.

9. A computer-implemented method to verify a product provenance, the method comprising:
    generating, by executing an instruction with a processor, a first unsigned block to store first processing data associated with the product by a first entity;
    signing, by executing an instruction with the processor, the first unsigned block with a first private key to generate a blockchain having a first signed block;
    generating, by executing an instruction with the processor, a second unsigned block in response to a second entity generating second processing data associated with the product by the second entity;
    expanding, by executing an instruction with the processor, the blockchain by signing the second unsigned block with a second private key to generate a second signed block within the blockchain;
    blocking access to a first public key and a second public key corresponding to the first entity and the second entity, respectively, when an indication of completion of the blockchain is not present; and
    verifying, by executing an instruction with the processor, the product provenance by validating the first processing data and the second processing data using the respective public keys associated with the first entity and the second entity when the indication of completion of the blockchain is present.

10. The method as defined in claim 9, further including associating the blockchain with a pending blockchain identifier when a target number of entities has not expanded the blockchain with respective signed blocks.

11. The method as defined in claim 10, further including preventing verification of the product provenance when the pending blockchain ID includes an incomplete blockchain status indicator.

12. The method as defined in claim 9, further including:
    retrieving a portion of a deoxyribonucleic acid (DNA) string from the product; and
    translating the portion to a binary string.

13. The method as defined in claim 12, further including:
    generating a signature of the binary string; and
    translating the signature of the binary string to a signed DNA representation using at least one of the first private key or the second private key.

14. The method as defined in claim 13, further including applying pre-markers and post-markers to the signed DNA representation to generate a DNA signature.

15. The method as defined in claim 14, further including splicing the DNA signature into the product.

16. The method as defined in claim 15, further including validating a binary representation of the DNA representation of the DNA signature with a third public key, the third public key paired with a private key used to generate the signature of the binary string.

17. A tangible computer-readable medium comprising instructions that, when executed, cause a processor to, at least:
generate a first unsigned block to store first processing data associated with the product by a first entity;
sign the first unsigned block with a first private key to generate a blockchain having a first signed block;
generate a second unsigned block in response to a second entity generating second processing data associated with the product by the second entity;
expand the blockchain by signing the second unsigned block with a second private key to generate a second signed block within the blockchain;
block access to a first public key and a second public key corresponding to the first entity and the second entity, respectively, when an indication of completion of the blockchain is not present; and
verify the product provenance by validating the first processing data and the second processing data using the respective public keys associated with the first entity and the second entity when the indication of completion of the blockchain is present.

18. The computer-readable medium as defined in claim 17, wherein the instructions, when executed, further cause the processor to associate the blockchain with a pending blockchain identifier when a target number of entities has not expanded the blockchain with respective signed blocks.

19. The computer-readable medium as defined in claim 18, wherein the instructions, when executed, further cause the processor to prevent verification of the product provenance when the pending blockchain ID includes an incomplete blockchain status indicator.

20. The computer-readable medium as defined in claim 17, wherein the instructions, when executed, further cause the processor to:
retrieve a portion of a deoxyribonucleic acid (DNA) string from the product; and
translate the portion to a binary string.

21. The computer-readable medium as defined in claim 20, wherein the instructions, when executed, further cause the processor to:
generate a signature of the binary string; and
translate the signature of the binary string to a signed DNA representation using at least one of the first private key or the second private key.

22. The computer-readable medium as defined in claim 21, wherein the instructions, when executed, further cause the processor to apply pre-markers and post-markers to the signed DNA representation to generate a DNA signature.

23. The computer-readable medium as defined in claim 22, wherein the instructions, when executed, further cause the processor to splice the DNA signature into the product.

24. The computer-readable medium as defined in claim 23, wherein the instructions, when executed, further cause the processor to validate a binary representation of the DNA representation of the DNA signature with a third public key, the third public key paired with a private key used to generate the signature of the binary string.

* * * * *